(12) United States Patent
Chen et al.

(10) Patent No.: US 12,457,801 B2
(45) Date of Patent: Oct. 28, 2025

(54) APR PLACEMENT FOR HYBRID SHEET CELLS

(71) Applicant: Taiwan Semiconductor Manufacturing Company, Ltd., Hsinchu (TW)

(72) Inventors: Kuan-Yu Chen, Hsinchu (TW); Wei-Cheng Tzeng, Taipei (TW); Shih-Wei Peng, Hsinchu (TW); Wei-Cheng Lin, Taichung (TW); Jiann-Tyng Tzeng, Hsinchu (TW)

(73) Assignee: Taiwan Semiconductor Manufacturing Company Ltd., Hsinchu (TW)

( * ) Notice: Subject to any disclaimer, the term of this patent is extended or adjusted under 35 U.S.C. 154(b) by 953 days.

(21) Appl. No.: 17/581,365

(22) Filed: Jan. 21, 2022

(65) Prior Publication Data
US 2023/0053139 A1    Feb. 16, 2023

Related U.S. Application Data

(60) Provisional application No. 63/232,527, filed on Aug. 12, 2021.

(51) Int. Cl.
| H10D 84/85 | (2025.01) |
| G06F 30/31 | (2020.01) |
| G06F 30/392 | (2020.01) |
| H01L 21/02 | (2006.01) |
| H10D 30/01 | (2025.01) |
| H10D 30/67 | (2025.01) |
| H10D 62/10 | (2025.01) |
| H10D 84/01 | (2025.01) |
| H10D 84/03 | (2025.01) |

(52) U.S. Cl.
CPC .......... *H10D 84/856* (2025.01); *G06F 30/31* (2020.01); *G06F 30/392* (2020.01); *H01L 21/0259* (2013.01); *H10D 30/031* (2025.01); *H10D 30/6735* (2025.01); *H10D 30/6757* (2025.01); *H10D 62/118* (2025.01); *H10D 84/0167* (2025.01); *H10D 84/038* (2025.01)

(58) Field of Classification Search
CPC ............... H10D 84/856; H10D 30/031; H10D 30/6735; H10D 30/6757; H10D 62/118; H10D 84/0167; H10D 84/038; H10D 89/10; H10D 84/85; G06F 30/31; G06F 30/392; H01L 21/0259
See application file for complete search history.

(56) References Cited

U.S. PATENT DOCUMENTS

2020/0287039 A1 * 9/2020 Bi .................... H10D 62/292
2021/0358902 A1 * 11/2021 Kang ................ H10D 84/0186

* cited by examiner

Primary Examiner — Patricia D Valenzuela
(74) Attorney, Agent, or Firm — Merchant & Gould P.C.

(57) ABSTRACT

A device including first nanosheet structures each including a first number of nanosheets, second nanosheet structures each including a second number of nanosheets that is different than the first number of nanosheets, and a plurality of rows including first rows and second rows. Where each of the first nanosheet structures is in a respective one of the first rows, each of the second nanosheet structures is in a respective one of the second rows, at least two of the first rows are adjacent one another, and at least two of the second rows are adjacent one another.

20 Claims, 18 Drawing Sheets

APR PLACEMENT FOR HYBRID SHEET CELLS

CROSS-REFERENCE TO RELATED APPLICATIONS

This application claims the benefit of U.S. Provisional Patent Application No. 63/232,527, filed on Aug. 12, 2021, the disclosure of which is incorporated by reference in its entirety.

BACKGROUND

Typically, automated tools are employed to assist semiconductor designers in manufacturing a circuit, including taking a functional design of a circuit to a finished layout of the circuit. Integrated circuit (IC) automated design tools are used to transform the circuit design into a circuit layout to be manufactured. This process includes turning a behavioral description of the circuit into a functional description, which is then decomposed into logic functions and mapped into rows of cells using a standard cell library that includes standard cells for predetermined logical functions, such as NAND, NOR, latch, and flip-flop functions. Automatic place and route (APR) methods and systems may be employed to construct the IC layouts where selected standard cells are placed next to one another in the IC layout. Once mapped into rows of cells, a synthesis is performed to turn the structural design into a physical layout, a clock tree is built to synchronize the structural elements, and the design is optimized post layout.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

DETAILED DESCRIPTION

Figure 1:
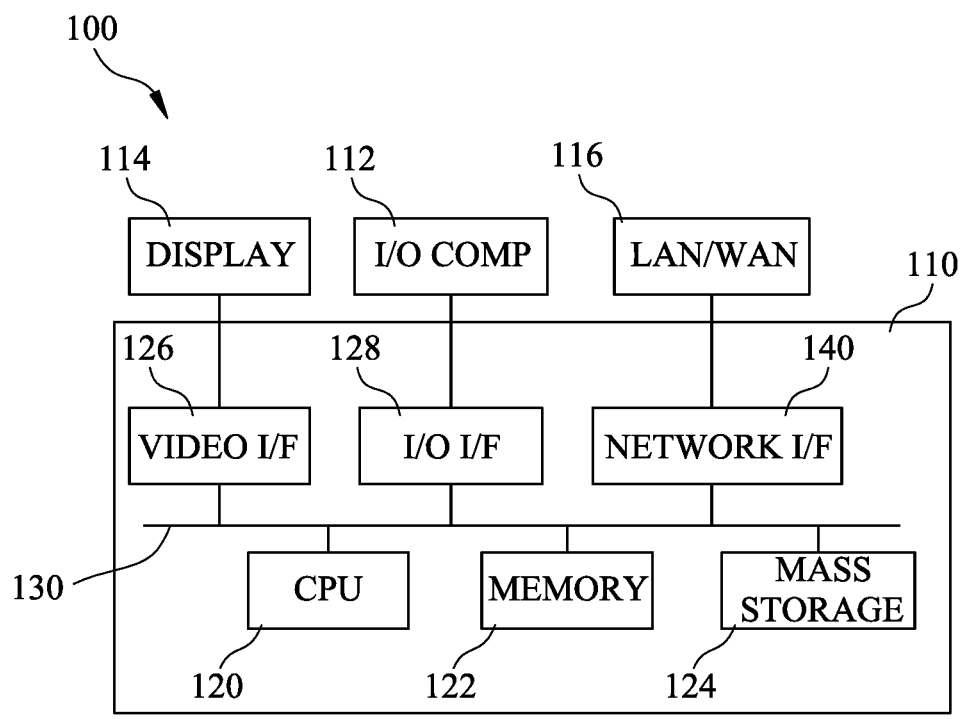
FIG. 1 is a block diagram schematically illustrating an example of a processing system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the manufacturing process, to avoid problems with aligning standard cells from a standard cell library with power rails and reference rails and/or to avoid problems with design rules, a decision is made early-on to select a standard cell height for the design, such that the standard cell library corresponding to the selected standard cell height is used for the structural design and synthesis processes. Disclosed embodiments include standard cells that have a 1× cell height H equal to the height of two rows of devices, such as one N-channel metal-oxide semiconductor (NMOS) row and one P-channel metal-oxide semiconductor (PMOS) row.

Disclosed embodiments are further directed to IC's that include nanosheet devices, such as nanosheet transistors. In some embodiments, the nanosheet devices include a plurality of stacked nanosheets extending between source/drain epitaxial (EPI) regions formed on an active region, which may include an oxide layer or oxide diffusion (OD). The term "nanosheet" is used herein to designate any material portion with nanoscale, or even microscale, dimensions and having an elongate shape, regardless of the cross-sectional shape of the portion. Thus, the term "nanosheet" designates elongate material portions having circular and substantially circular cross-sections, such as cylindrical material portions, and elongate material portions having rectangular and substantially rectangular cross sections, such as beam and bar-shaped material portions.

In the manufacturing process, selected parameters of the nanosheet devices can be changed to improve the power, performance, and area (PPA) of the IC. For example, the active area or OD of the nanosheets can be varied ("OD JOG") to improve the PPA of the IC.

In disclosed embodiments, the number of nanosheets in an NMOS row and the number of nanosheets in a PMOS rows can be adjusted to improve the PPA of an IC. In some embodiments, the number of nanosheets in an NMOS row is equal to the number of nanosheets in a PMOS row, such as two nanosheets in each row or three nanosheets in each row. In some embodiments, hybrid nanosheet structures include one number of nanosheets in an NMOS row and a different number of nanosheets in a PMOS row. For example, an NMOS row may have three nanosheets and a PMOS row two nanosheets.

In circuits that use hybrid nanosheet structures, the nanosheet structures that have a different number of nanosheets, such as two nanosheets and three nanosheets, get intermingled with one another in adjacent rows and in the same row. In these circuits, two nanosheet structures may have a 0.5× cell height and be situated in adjacent rows and kiddy-corner from one another, making what is referred to herein as a point touch pattern. Manufacturing these point touch patterns is more difficult than manufacturing simpler patterns, such that either two immersion masks are needed to make the two nanosheet point touch pattern or one extreme ultra-violet mask is needed to make the two nanosheet pattern. This is more expensive than making a simpler pattern that avoids point touch patterns, where single immersion masks can be used to make the simpler pattern.

Disclosed embodiments provide systems and methods, including APR systems and methods, configured to provide devices with patterns of rows having one number of nanosheets, such as two nanosheets or three nanosheets, that are greater than or equal to a 1× cell height and without point touches. Thus, only one immersion mask is needed to manufacture these patterns, which reduces costs.

Disclosed embodiments further provide devices and methods of manufacturing devices that include first nanosheet structures including a first number of nanosheets and second nanosheet structures including a second number of nanosheets that is different than the first number of nanosheets, where the first nanosheet structures are arranged in the device to have at least a 1× cell height and the second nanosheet structures are arranged in the device to have at least a 1× cell height.

Disclosed embodiments also provide devices and methods of manufacturing devices that include row plans that include a plurality of nanosheet cell structures, where each of the nanosheet cell structures includes NMOS nanosheet structures in a first row and PMOS nanosheet structures in a second row, and where NMOS and PMOS nanosheet structures that have the same number of nanosheets are situated adjacent one another to provide at least a 1× cell height.

In some embodiments, the row plans include first cell structures that include NMOS nanosheet structures that include a first number of nanosheets and PMOS nanosheet structures that include a second number of nanosheets and second cell structures that include NMOS nanosheet structures that include a third number of nanosheets and PMOS nanosheet structures that include a fourth number of nanosheets, where different row plans include different ratios of the first cell structures to the second cell structures.

FIG. 1 is a block diagram schematically illustrating an example of a processing system 100, in accordance with some embodiments. The processing system 100 is configured to provide the systems and methods described herein.

The processing system 100 includes a processing unit 110, such as a desktop computer, a workstation, a laptop computer, a dedicated processor customized for a particular application, a smart phone, and/or a tablet. Also, the processing system 100 includes a display 114 and one or more input/output components or devices 112, such as a mouse, a keyboard, a touchscreen, and/or a printer.

The processing unit 110 includes a central processing unit (CPU) 120, memory 122, a mass storage device 124, a video interface 126, and an I/O interface 128, which are connected to a bus 130. The bus 130 may be one or more bus architectures, such as a memory bus, a controller bus, a peripheral bus, and/or a video display bus. The CPU 120 can be one or more electronic data processors, and the memory 122 includes system memory, such as static random-access memory (SRAM), dynamic random-access memory (DRAM), flash memory, programmable read-only memory (PROM), and/or read-only memory (ROM).

The mass storage device 124 includes any type of storage device configured to store data, programs, and other information and to make the data, programs, and other information accessible via the bus 130. The mass storage device 124 includes, for example, one or more of a hard disk drive, a magnetic disk drive, and/or an optical disk drive, or the like.

The term computer readable media as used herein includes computer storage media, such as the memory 122 and the mass storage device 124. Computer storage media also includes volatile and nonvolatile memory, and removable and non-removable media, implemented in any method or technology for storage of information, such as computer readable instructions, data structures, and/or program modules. Thus, computer storage media includes RAM, ROM, electrically erasable read-only memory (EEPROM), flash memory and other memory technologies, CD-ROM, digital versatile disks (DVD) and other optical storage, magnetic cassettes, magnetic tape, magnetic disk storage and other magnetic storage devices, and any other article of manufacture which can be used to store information, and which can be accessed by the processing device 100. In some embodiments, the computer storage media is part of the processing device 100. The computer storage media does not include a carrier wave or other propagated or modulated data signal.

Communication media can be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or a direct-wired connection, and wireless media such as acoustic, radio frequency (RF), infrared, and other wireless media.

The video interface 126 and the I/O interface 128 provide interfaces to couple external input and output devices to the processing unit 110. As illustrated in FIG. 1, examples of input and output devices include the display 114 coupled to the video interface 126 and the I/O components 112 coupled to the I/O interface 128. Other devices may be coupled to the processing unit 110, and additional or fewer interface cards may be utilized. For example, a serial interface card (not shown) may be used to provide a serial interface to a printer. The processing unit 110 can also include a network interface 140 that provides a wired link to a local area network (LAN) and/or a wide area network (WAN) 116 and/or a wireless link.

Embodiments of the processing system 100 include other components. In some embodiments, the processing system 100 includes power supplies, cables, a motherboard, removable storage media, cases, and the like. In some embodiments, these other components, although not shown, are considered part of the processing system 100.

Also, in some embodiments, software code is executed by the CPU 120 to analyze a user design to obtain an IC layout and manufacture the IC. The software code can be accessed by the CPU 120 via the bus 130 from the memory 122, the mass storage device 124, or the like, or remotely through the network interface 140.

Figure 2:
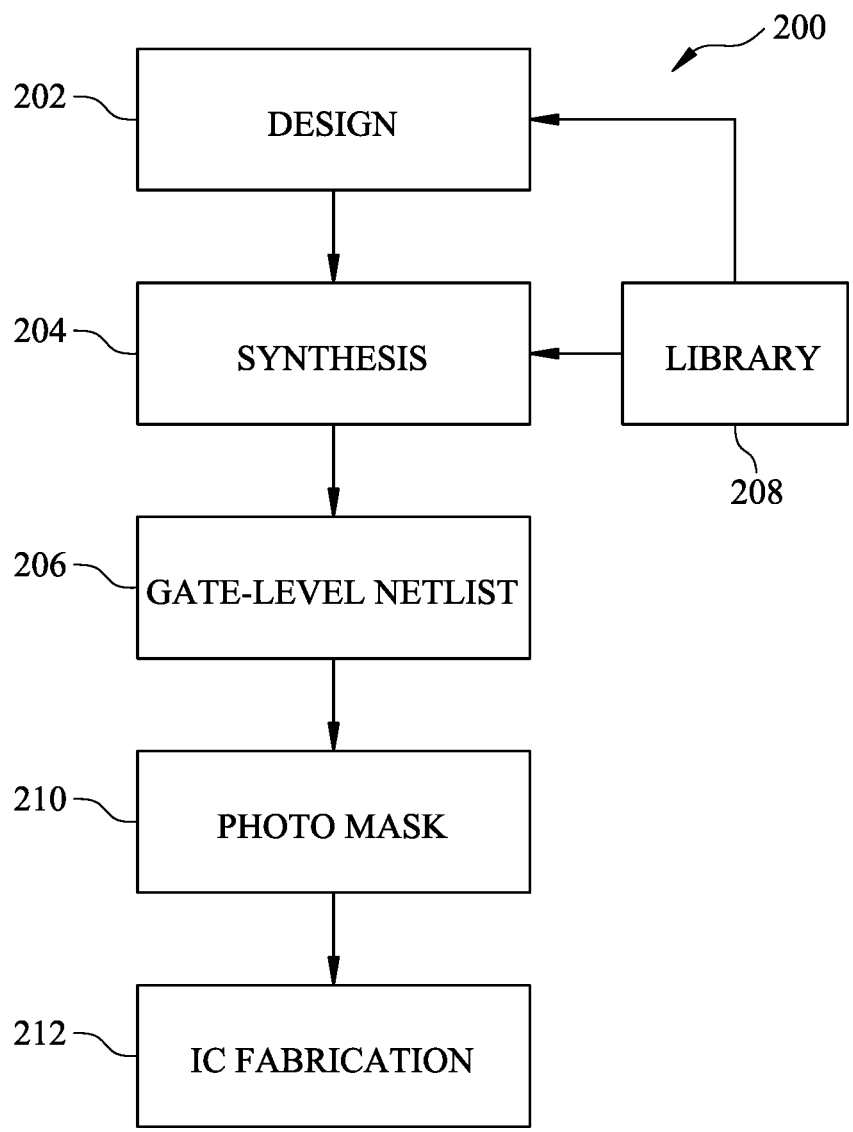
FIG. 2 is a diagram schematically illustrating an example IC design and fabrication process that can be implemented by the processing system of FIG. 1, in accordance with some embodiments.

FIG. 2 is a diagram schematically illustrating an example IC design and fabrication process 200 that can be implemented by the processing system 100, in accordance with some embodiments. The IC design and fabrication process 200 is for generating a physical layout from a user supplied behavioral/functional design and, in some embodiments, for manufacturing the IC.

The user design 202 specifies the desired behavior and functions of the circuit based upon various signals and stimuli applied to the inputs of the overall design. The design 202 can be written in a suitable programming language. The design 202 can be uploaded into the processing unit 110 through the I/O interface 128, uploaded through the network interface 140 by a remote user, saved in the memory 122, and/or saved in the mass storage device 124.

A synthesis 204 is performed on the design, in which the behavior and functions described in the design 202 are transformed to a functionally equivalent logic gate-level circuit description by matching the design to standard cells, such as standard cells from a standard cell library 208.

The standard cell library 208 includes a listing of predetermined and pre-designed components and cells, each of which perform a logic function. The standard cells are stored in the standard cell library 208 as information comprising internal circuit elements, connections to these circuit elements, and a predetermined physical layout pattern that includes the height of each cell along with the cell's designed power rails, dopant implants, wells, and the like. Additionally, the stored standard cell can include a shape of the cell, terminal positions for external connections, delay characteristics, and power consumption, and the like. The standard cell library 208 can be stored, for example, in one or more databases contained in the mass storage 124.

The synthesis 204 results in a functionally equivalent logic gate-level circuit description, such as a gate-level netlist 206. Based on the gate-level netlist 206, a photolithographic mask 210 is generated and used to fabricate the IC 212.

In some embodiments, the processing system 100 is configured to manufacture devices that include nanosheet cell structures that include NMOS nanosheet structures in a first row and PMOS nanosheet structures in a second row. In some embodiments, the processing system 100 is configured to manufacture devices wherein PMOS nanosheet structures and NMOS nanosheet structures that have the same number of nanosheets are situated adjacent one another to provide at least a 1× cell height. In some embodiments, the processing system 100 is configured to manufacture devices that include nanosheet structures having the same number of nanosheets arranged in the device to have at least a 1× cell height, where the nanosheet structures can be single rows or multiple rows of PMOS or NMOS nanosheet structures.

Figure 3:
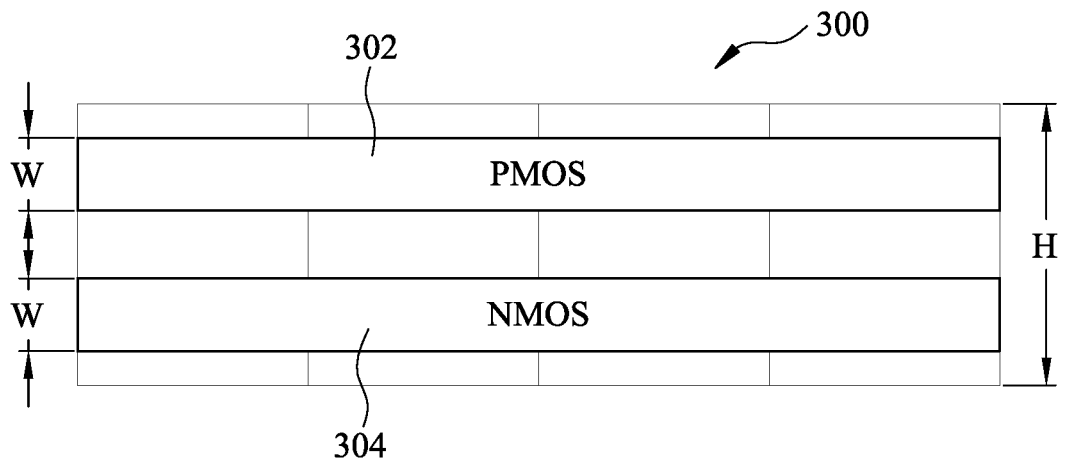
FIG. 3 is a diagram schematically illustrating a nanosheet cell structure that can be used in the devices disclosed herein, in accordance with some embodiments.

FIG. 3 is a diagram schematically illustrating a nanosheet cell structure 300 that can be used in the devices disclosed herein, in accordance with some embodiments. The nanosheet cell structure 300 includes one row of PMOS nanosheet structures 302 and one row of NMOS nanosheet structures 304. The nanosheet cell structure 300 has a 1× cell height H and an oxide diffusion (OD) width W. In some embodiments, the OD width W of the PMOS nanosheet structures 302 is the same as the OD width W of the NMOS nanosheet structures 304. In some embodiments, the OD width W of the PMOS nanosheet structures 302 is different than the OD width W of the NMOS nanosheet structures 304.

The PMOS nanosheet structures 302 and the NMOS nanosheet structures 304 include multiple stacked nanosheets for making devices and components, such as standard cell devices and components. The number of nanosheets in the row of PMOS nanosheet structures 302 and the number of nanosheets in the row of NMOS nanosheet structures 304 can be adjusted to improve the PPA of the IC. In some embodiments, the number of nanosheets in the row of PMOS nanosheet structures 302 is equal to the number of nanosheets in the row of NMOS nanosheet structures 304. In some embodiments, referred to as hybrid nanosheet structures, the number of nanosheets in the row of PMOS nanosheet structures 302 is different than the number of nanosheets in the row of NMOS nanosheet structures 304.

FIGS. 4-7 are diagrams schematically illustrating example nanosheet cell structures 306, 308, 310, and 312 that include rows of nanosheet structures having either two nanosheets or three nanosheets. The nanosheet cell structures 306, 308, 310, and 312 can be used in the devices disclosed herein. In some embodiments, each of the nanosheet cell structures 306, 308, 310, and 312 is like the nanosheet cell structure 300 of FIG. 3. In other embodiments, the nanosheet cell structures 306, 308, 310, and 312 include rows of nanosheet structures that have a different number of nanosheets, such as four nanosheets or more than four nanosheets.

Figure 4:
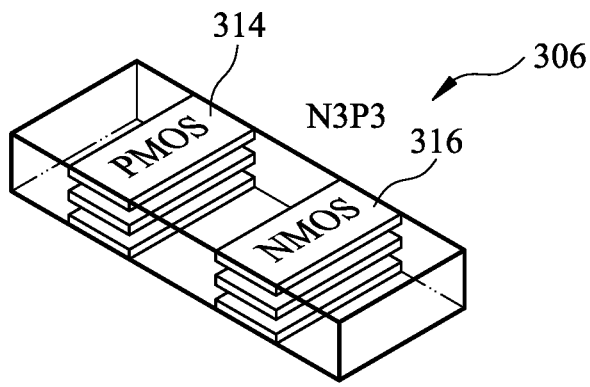
FIG. 4 is a diagram schematically illustrating a nanosheet cell structure including a row of PMOS nanosheet structures that includes three nanosheets and a row of NMOS nanosheet structures that includes three nanosheets, in accordance with some embodiments.

FIG. 4 is a diagram schematically illustrating the nanosheet cell structure 306 including a row of PMOS nanosheet structures 314 that includes three nanosheets (P3) and a row of NMOS nanosheet structures 316 that includes three nanosheets (N3), in accordance with some embodiments. The nanosheet cell structure 306 is referred to as an N3P3 nanosheet cell structure.

Figure 5:
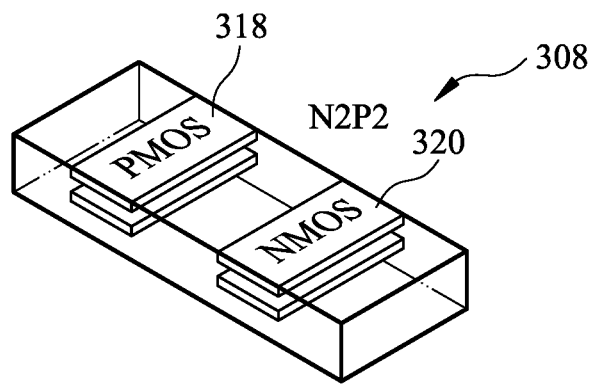
FIG. 5 is a diagram schematically illustrating a nanosheet cell structure including a row of PMOS nanosheet structures that includes two nanosheets and a row of NMOS nanosheet structures that includes two nanosheets, in accordance with some embodiments.

FIG. 5 is a diagram schematically illustrating the nanosheet cell structure 308 including a row of PMOS nanosheet structures 318 that includes two nanosheets (P2) and a row of NMOS nanosheet structures 320 that includes two nanosheets (N2), in accordance with some embodiments. The nanosheet cell structure 308 is referred to as an N2P2 nanosheet cell structure.

Figure 6:
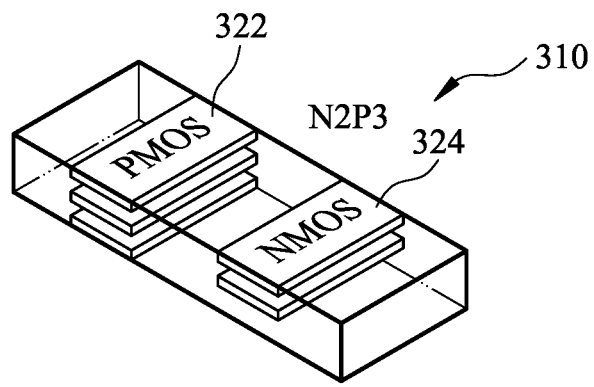
FIG. 6 is a diagram schematically illustrating a nanosheet cell structure including a row of PMOS nanosheet structures that includes three nanosheets and a row of NMOS nanosheet structures that includes two nanosheets, in accordance with some embodiments.

FIG. 6 is a diagram schematically illustrating the nanosheet cell structure 310 including a row of PMOS nanosheet structures 322 that includes three nanosheets (P3) and a row of NMOS nanosheet structures 324 that includes two nanosheets (N2), in accordance with some embodiments. The nanosheet cell structure 310 is referred to as an N2P3 nanosheet cell structure.

Figure 7:
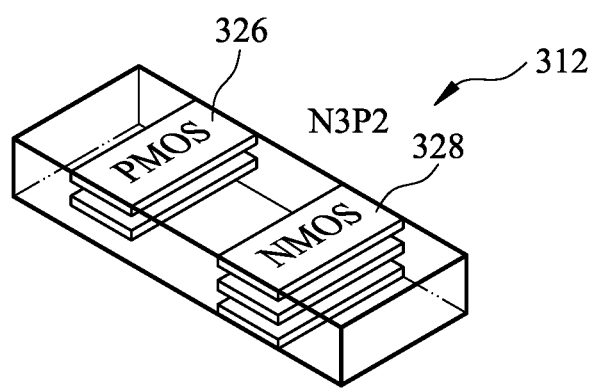
FIG. 7 is a diagram schematically illustrating a nanosheet cell structure including a row of PMOS nanosheet structures that includes two nanosheets and a row of NMOS nanosheet structures that includes three nanosheets, in accordance with some embodiments.

FIG. 7 is a diagram schematically illustrating the nanosheet cell structure 312 including a row of PMOS nanosheet structures 326 that includes two nanosheets (P2) and a row of NMOS nanosheet structures 328 that includes three nanosheets (N3), in accordance with some embodiments. The nanosheet cell structure 312 is an N3P2 nanosheet cell structure.

Figure 8:
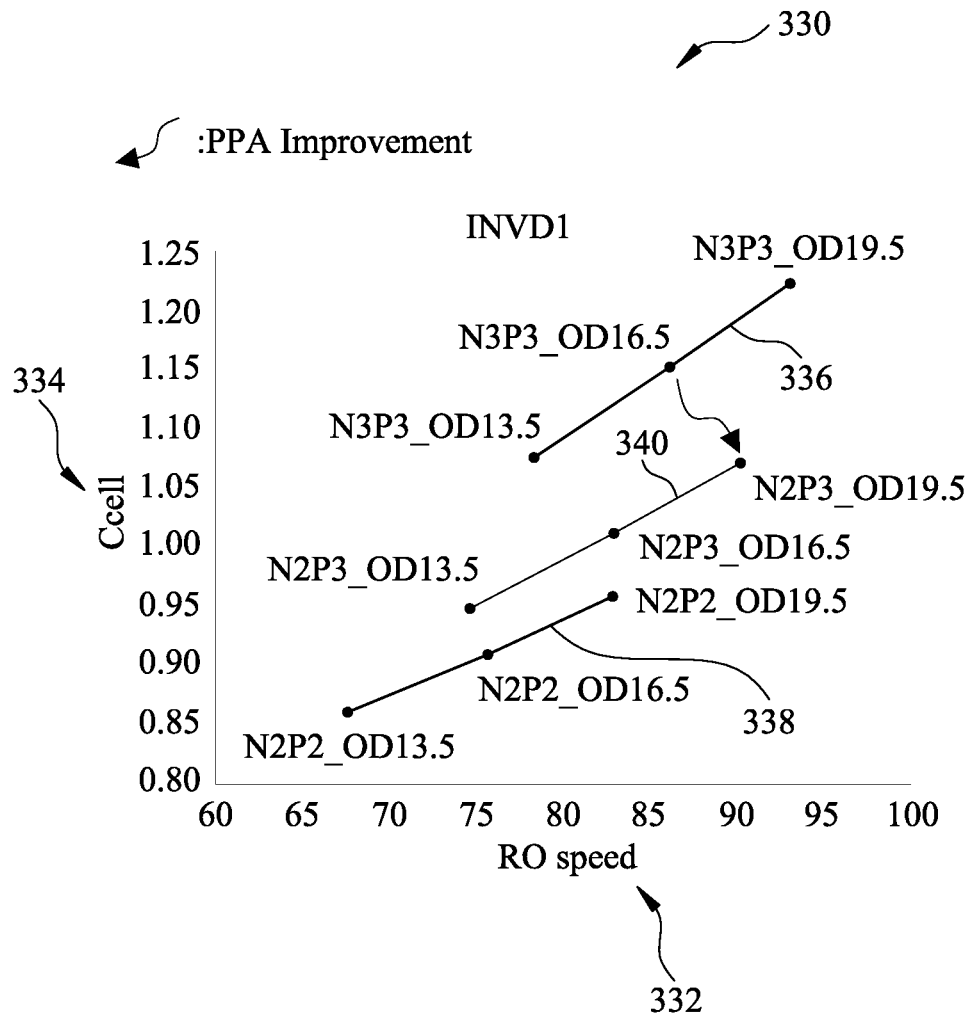
FIG. 8 is a diagram schematically illustrating a graph of ring oscillator (RO) speed and cell capacitance (Ccell) for a device built with each of three different nanosheet cell structures, in accordance with some embodiments.

FIG. 8 is a diagram schematically illustrating a graph 330 of ring oscillator (RO) speed and cell capacitance (Ccell) for a device built with each of the three nanosheet cell structures 306, 308, and 310, in accordance with some embodiments. The RO speed of the device is graphed along the x-axis at 332 and the Ccell, which is related to power consumption of the device, is graphed along the y-axis at 334. The parameters of the device were graphed for three different OD widths W of 19.5, 16.5, and 13.5 nanometers (nm) for each of the nanosheet cell structures 306, 308, and 310.

At 336, the RO speed and Ccell are graphed for the device built with nanosheet cell structures 306 and OD widths of 19.5, 16.5, and 13.5 nms. At 338, the RO speed and Ccell are graphed for the device built with nanosheet cell structures 308 and OD widths of 19.5, 16.5, and 13.5 nms. At 340, the RO speed and Ccell are graphed for the device built with nanosheet cell structures 310 and OD widths of 19.5, 16.5, and 13.5 nms.

Adjusting the number of nanosheets in the row of PMOS nanosheet structures and/or the number of nanosheets in the row of NMOS nanosheet structures can be used to improve the PPA of a device. For example, a device including nanosheet cell structures 306 N3P3 and having an OD width W of 16.5 nm can be replaced by a device including nanosheet cell structures 310 N2P3 (one less nanosheet in the NMOS nanosheet structures) and having an OD width W of 19.5 to improve the PPA, where the RO speed is increased from about 87 to 90 and the Ccell (power consumption) is reduced from 1.15 to 1.07. Thus, the PPA of the IC is improved by including the hybrid nanosheet structures 310 N2P3 in the device.

In circuits that use hybrid nanosheet structures, such as the hybrid nanosheet structures 310 and 312, designs can become quite complex such that nanosheet structures having different numbers of nanosheets get intermingled with one another in the same row and in adjacent rows. In these circuits, standard cells may be built with nanosheet structures having two nanosheets situated in adjacent rows and kiddy-corner from one another, with the corners touching to form a point touch pattern.

Manufacturing these point touch patterns is more difficult than manufacturing simpler patterns, such that either two immersion masks are needed to make the point touch pattern, or one extreme ultra-violet mask is needed to make the point touch pattern. This is more expensive than making a simpler pattern that avoids point touch patterns and where a single immersion mask can be used to make the simpler pattern.

Figure 9:
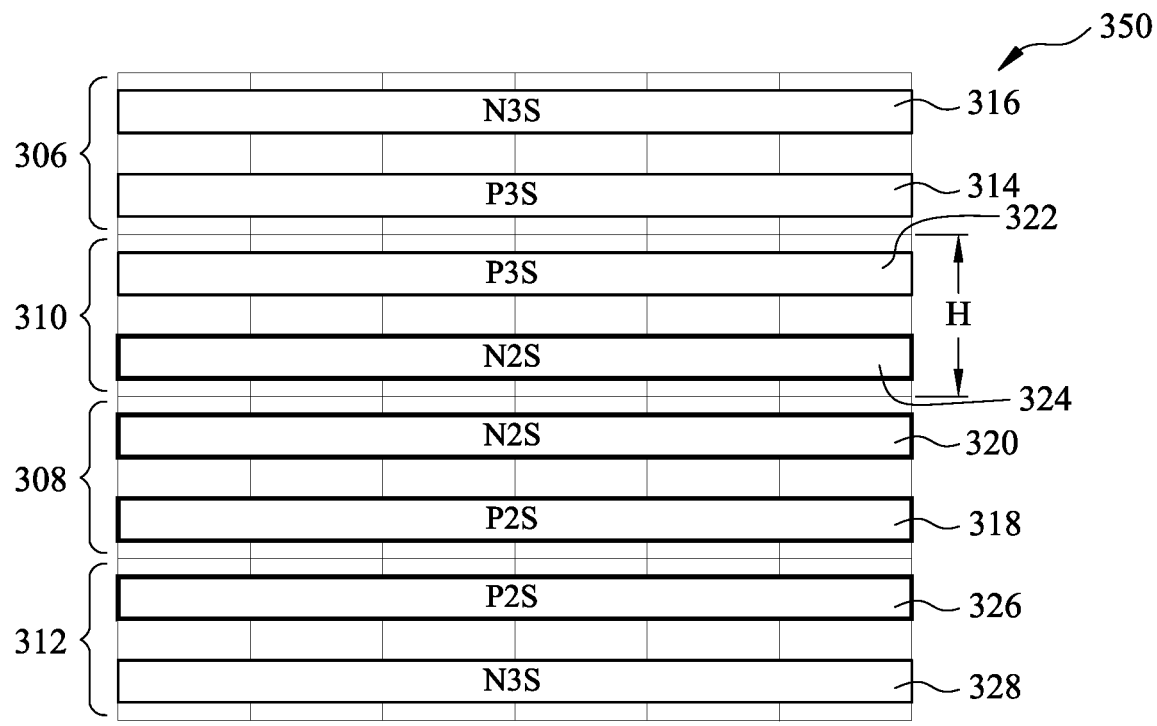
FIG. 9 is a diagram schematically illustrating a device that is laid out and manufactured to provide nanosheet structures having two nanosheets in a pattern that has at least a 1× cell height H, in accordance with some embodiments.

FIG. 9 is a diagram schematically illustrating a device 350 that is laid out and manufactured to provide nanosheet structures having two nanosheets in a pattern that has at least a 1× cell height H, in accordance with some embodiments. The processing system 100 is configured to provide systems and methods, including APR systems and methods, that lay out and manufacture devices, such as device 350, with rows having one number of nanosheets, such as two nanosheets or three nanosheets, arranged in patterns that have a height that is greater than or equal to a 1× cell height H and without point touches. Thus, only one immersion mask is needed to manufacture these patterns, which reduces costs. In some embodiments, the resolution of the mask is about the same as the 1× cell height H.

The device 350 has a row plan or pattern that includes each of the nanosheet cell structures 306, 308, 310, and 312 of FIGS. 4-7, respectively. From top to bottom, the row plan includes nanosheet cell structure 306 N3P3, followed by nanosheet cell structure 310 N2P3, followed by nanosheet cell structure 308 N2P2, followed by nanosheet cell structure 312 N3P2. Each of the nanosheet cell structures 306, 308, 310, 312 includes a row of PMOS nanosheet structures and a row of NMOS nanosheet structures and has a 1× cell height H.

Figure 10:
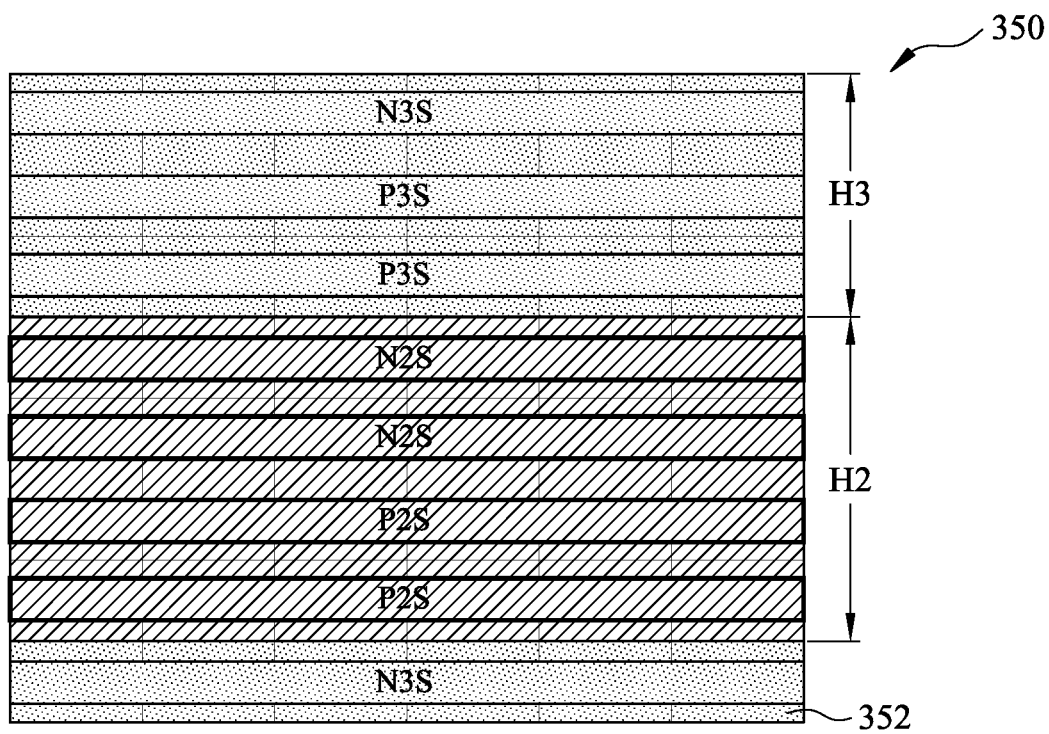
FIG. 10 is a diagram schematically illustrating the device of FIG. 9 with the three nanosheet rows having a cell height H3 and the two nanosheet rows having a cell height H2, in accordance with some embodiments.

FIG. 10 is a diagram schematically illustrating the device 350 with the three nanosheet rows having a cell height H3 and the two nanosheet rows having a cell height H2, in accordance with some embodiments.

In the device 350, three rows of the three nanosheet structures, including both PMOS and NMOS rows, are situated adjacent each other to have a 1.5× cell height H3 and four rows of the two nanosheet structures, including both PMOS and NMOS rows, are situated adjacent each other to have a 2× cell height H2. This arranges the two nanosheet rows of the nanosheet cell structures 306, 308, 310, and 312 in a pattern that has greater than a 1× cell height H and the three nanosheet rows of the nanosheet cell structures 306, 308, 310, and 312 in a pattern that has greater than a 1× cell height H, such that only one immersion mask is needed to manufacture these patterns, which reduces costs. Also, in some embodiments, in this pattern, the last row 352, which is a row of NMOS nanosheet structures having three nanosheets, can be manufactured with only one immersion mask.

In some embodiments, the device 350 is repeated in the vertical direction in the layout and manufacturing of an integrated circuit. The device 350 is repeated in the vertical direction, such that the last row 352, which is a row of NMOS nanosheet structures having three nanosheets, is adjacent the first three rows of three nanosheet structures situated adjacent each other and having a 1.5× cell height H3. This results in four rows of the three nanosheet structures, including the H3 rows and row 352, situated adjacent each other with a 2× cell height, like the 2× cell height H2. This pattern repeats itself in the vertical direction until the device 350 is no longer repeated in the vertical direction.

Figure 11:
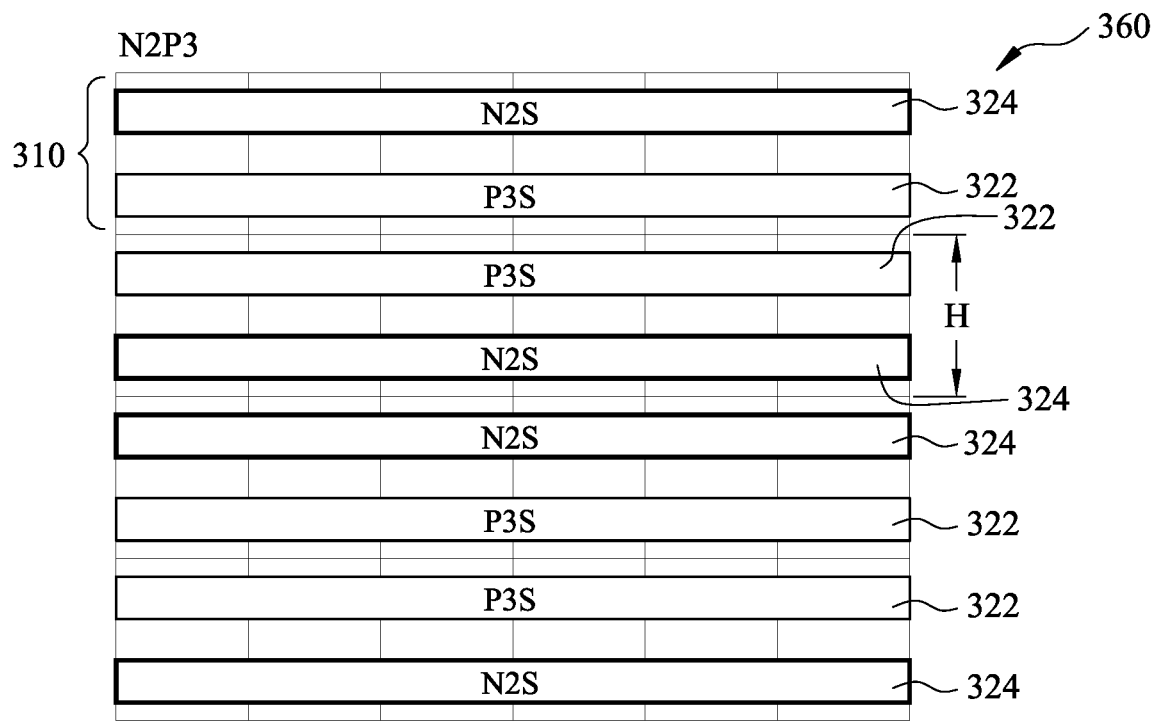
FIG. 11 is a diagram schematically illustrating a device that has a row plan or pattern including only one of the nanosheet cell structures N2P3, in accordance with some embodiments.

FIG. 11 is a diagram schematically illustrating a device 360 that has a row plan or pattern including only one of the nanosheet cell structures 310 N2P3, in accordance with some embodiments. Each of the nanosheet cell structures 310 has a 1× cell height H and includes a row of PMOS nanosheet structures having three nanosheets and a row of NMOS nanosheet structures having two nanosheets. In other embodiments, the device 360 can include a different one or more than one of the nanosheet cell structures 306, 308, 310, and 312.

In this example, the processing system 100 is configured to provide systems and methods, including APR systems and methods, that lay out and manufacture devices, such as the device 360, with patterns of rows having one number of nanosheets, such as two nanosheets or three nanosheets, arranged to have a height that is greater than or equal to the 1× cell height H and without point touches. Thus, only one immersion mask is needed to manufacture these patterns, which reduces costs. In some embodiments, the resolution of the mask is about the same as the 1× cell height H.

Figure 12:
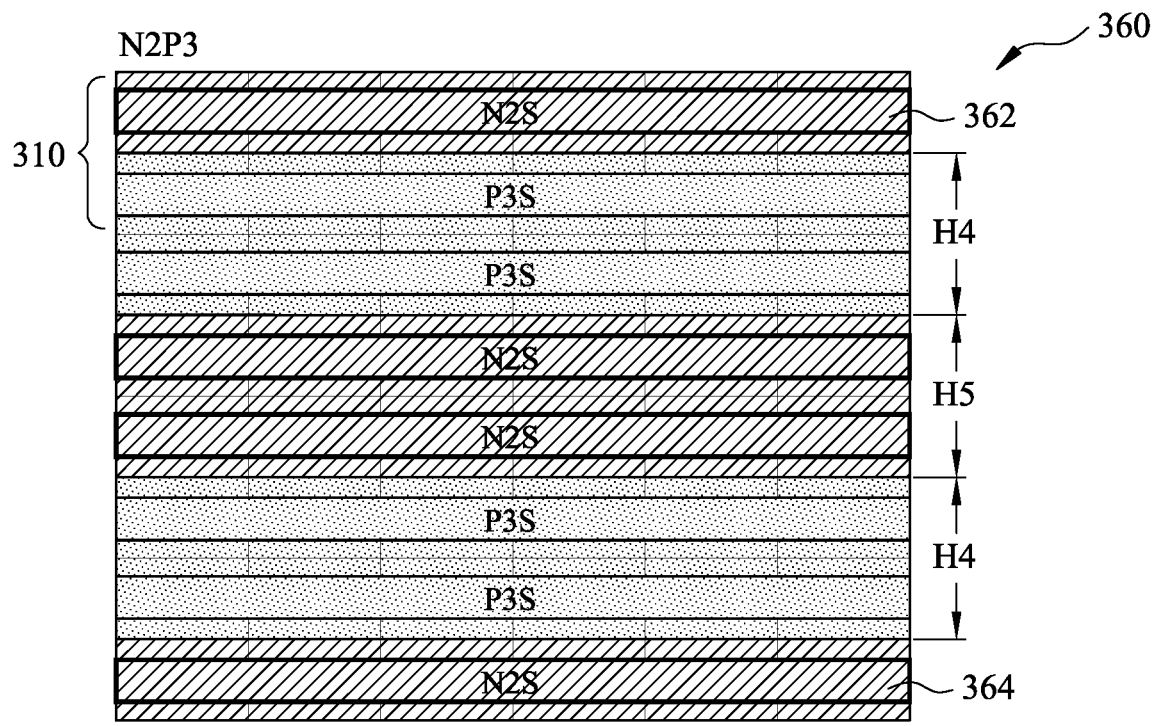
FIG. 12 is a diagram schematically illustrating the device of FIG. 11 with the three nanosheet rows arranged in patterns that have a 1× cell height H4 and the two nanosheet rows arranged in a pattern that has a 1× cell height H5, in accordance with some embodiments.

FIG. 12 is a diagram schematically illustrating the device 360 with the three nanosheet rows arranged in patterns that have a 1× cell height H4 and the two nanosheet rows arranged in a pattern that has a 1× cell height H5, in accordance with some embodiments.

In the device 360, two rows of PMOS nanosheet structures having three nanosheets are situated adjacent each other to provide the pattern that has the 1× cell height H4 and two rows of NMOS nanosheet structures having two nanosheets are situated adjacent each other to provide the pattern that has the 1× cell height H5. Each of the two rows of PMOS nanosheet structures is from a different one of the nanosheet cell structures 310 N2P3 and each of the two rows of NMOS nanosheet structures is from a different one of the nanosheet cell structures 310 N2P3. Thus, the rows having three nanosheets are arranged in patterns having a 1× cell height H4 that is equal to the 1× cell height H, and the rows having two nanosheets are arranged in a pattern having a 1× cell height H5 that is equal to the 1× cell height H, without point touches, such that only one immersion mask is needed to manufacture the patterns, which reduces costs. Also, in some embodiments, in this row plan, the first row 362 and the last row 364, which are rows of NMOS nanosheet structures having two nanosheets, can be manufactured with only one immersion mask.

In some embodiments, the device 360 is repeated in the vertical direction in the layout and manufacturing of an integrated circuit. The device 360 is repeated in the vertical direction, such that the last row 364, which is a row of NMOS nanosheet structures having two nanosheets, is adjacent the first row 362, which is a row of NMOS nanosheet structures having two nanosheets. This results in two rows of two nanosheet structures, including the last row 364 and the first row 362, situated adjacent each other and having a 1× cell height, like the 1× cell height H5. This pattern repeats itself in the vertical direction until the device 360 is no longer repeated in the vertical direction.

Figure 13:
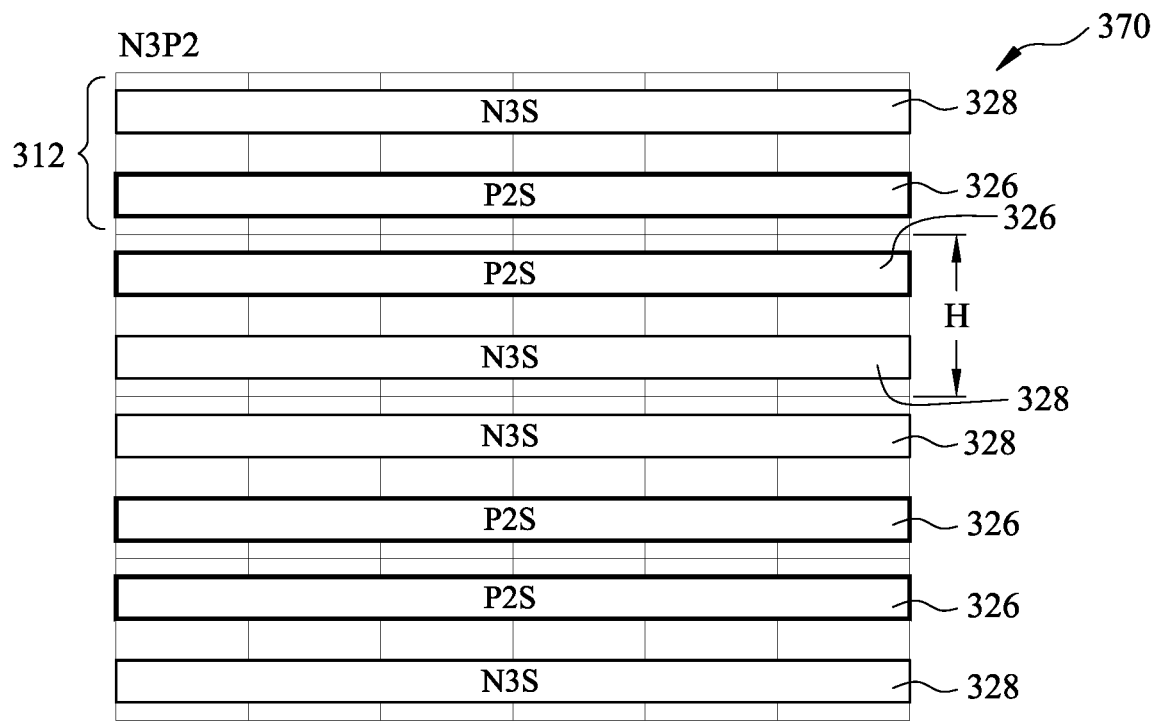
FIG. 13 is a diagram schematically illustrating a device that has a row plan or pattern including only one of the nanosheet cell structures N3P2, in accordance with some embodiments.

FIG. 13 is a diagram schematically illustrating the device 370 that has a row plan or pattern including only one of the nanosheet cell structures 312 N3P2, in accordance with some embodiments. Each of the nanosheet cell structures 312 has a 1× cell height H and includes a row of PMOS nanosheet structures having two nanosheets and a row of NMOS nanosheet structures having three nanosheets. In other embodiments, the device 370 can include a different one or more than one of the nanosheet cell structures 306, 308, 310, and In this example, the processing system 100 is configured to provide systems and methods, including APR systems and methods, that lay out and manufacture devices, such as the device 370, with patterns of rows having one number of nanosheets, such as two nanosheets or three nanosheets, arranged to have a height that is greater than or equal to the 1× cell height H and without point touches. Thus, only one immersion mask is needed to manufacture these patterns, which reduces costs. In some embodiments, the resolution of the mask is about the same as the 1× cell height H.

Figure 14:
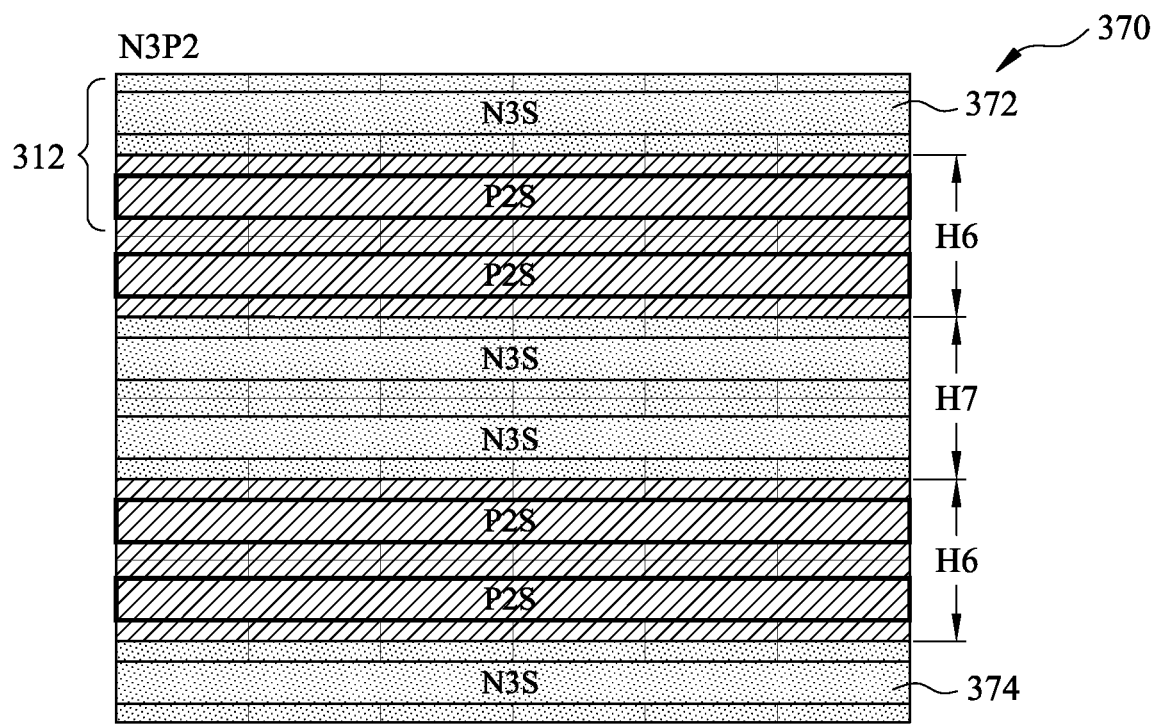
FIG. 14 is a diagram schematically illustrating the device of FIG. 13 with the two nanosheet rows arranged in patterns that have a 1× cell height H6 and the three nanosheet rows arranged in a pattern that has a 1× cell height H7, in accordance with some embodiments.

FIG. 14 is a diagram schematically illustrating the device 370 with the two nanosheet rows arranged in patterns that have a 1× cell height H6 and the three nanosheet rows arranged in a pattern that has a 1× cell height H7, in accordance with some embodiments.

In the device 370, two rows of PMOS nanosheet structures having two nanosheets are situated adjacent each other to provide the pattern that has the 1× cell height H6 and two rows of NMOS nanosheet structures having three nanosheets are situated adjacent each other to provide the pattern that has the 1× cell height H7. Each of the two rows of PMOS nanosheet structures is from a different one of the nanosheet cell structures 312 N3P2 and each of the two rows of NMOS nanosheet structures is from a different one of the nanosheet cell structures 312 N3P2. Thus, the rows having two nanosheets are arranged in patterns having a 1× cell height H6 that is equal to the 1× cell height H, and the rows having three nanosheets are arranged in a pattern having a 1× cell height H7 that is equal to the 1× cell height H, without point touches, such that only one immersion mask is needed to manufacture the patterns, which reduces costs. Also, in some embodiments, in this row plan, the first row 372 and the last row 374, which are rows of NMOS nanosheet structures having three nanosheets, can be manufactured with only one immersion mask.

In some embodiments, the device 370 is repeated in the vertical direction in the layout and manufacturing of an integrated circuit. The device 370 is repeated in the vertical direction, such that the last row 374, which is a row of NMOS nanosheet structures having three nanosheets, is adjacent the first row 372, which is a row of NMOS nanosheet structures having three nanosheets. This results in two rows of three nanosheet structures, including the last row 374 and the first row 372, situated adjacent each other and having a 1× cell height, like the 1× cell height H7. This pattern repeats itself in the vertical direction until the device 370 is no longer repeated in the vertical direction.

FIGS. 15-18 are diagrams schematically illustrating devices 400 and 450 that each include a row plan or pattern that includes each of the nanosheet cell structures 306, 308, 310, and 312 of FIGS. 4-7, respectively. The devices 400 and 450 include the nanosheet cell structures 306, 308, 310, and 312 in different ratios of one nanosheet cell structure to another nanosheet cell structure for the four nanosheet cell structures 306, 308, 310, and 312.

Figure 15:
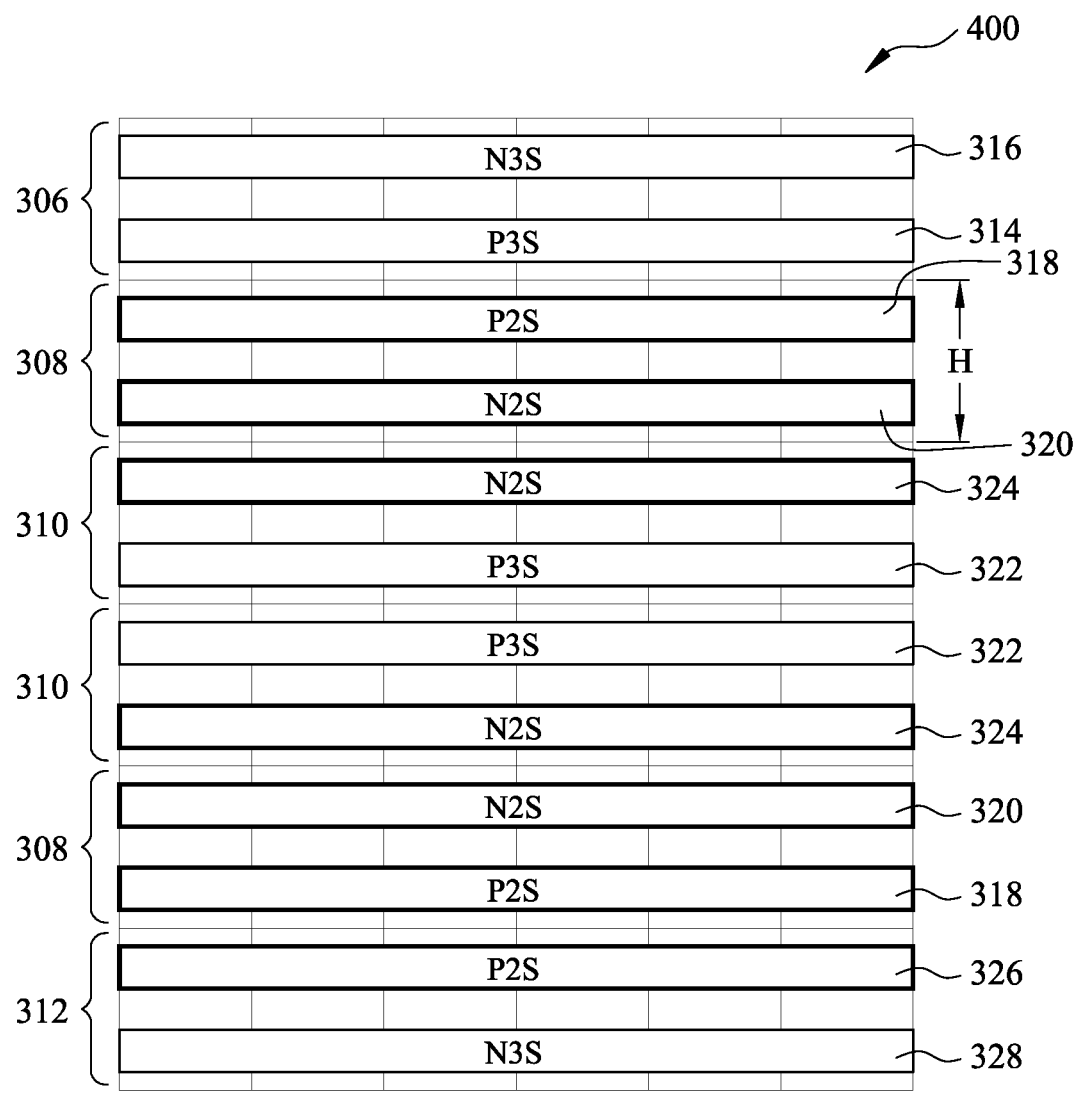
FIG. 15 is a diagram schematically illustrating a device that has a row plan with the ratio of one nanosheet cell structure to another nanosheet cell structure for four different nanosheet cell structures of 1:2:2:1, in accordance with some embodiments.

FIG. 15 is a diagram schematically illustrating the device 400 that has a row plan with the ratio of one nanosheet cell structure to another nanosheet cell structure for the four nanosheet cell structures 306, 308, 310, and 312 of 1:2:2:1, respectively, in accordance with some embodiments. The device 400 includes 1 nanosheet cell structure 306, 2 nanosheet cell structures 308, 2 nanosheet cell structures 310, and 1 nanosheet cell structure 312. Each of the nanosheet cell structures 306, 308, 310, and 312 has a 1× cell height H. In other embodiments, the device 400 can have a row plan with a different ratio of one nanosheet cell structure to another nanosheet cell structure for the four nanosheet cell structures 306, 308, 310, and 312.

In this example, the processing system 100 is configured to provide systems and methods, including APR systems and methods, that lay out and manufacture devices, such as the device 400, with patterns of rows having one number of nanosheets, such as two nanosheets or three nanosheets, arranged to have a height that is greater than or equal to the 1× cell height H and without point touches. Thus, only one immersion mask is needed to manufacture these patterns, which reduces costs. In some embodiments, the resolution of the mask is about the same as the 1× cell height H.

Figure 16:
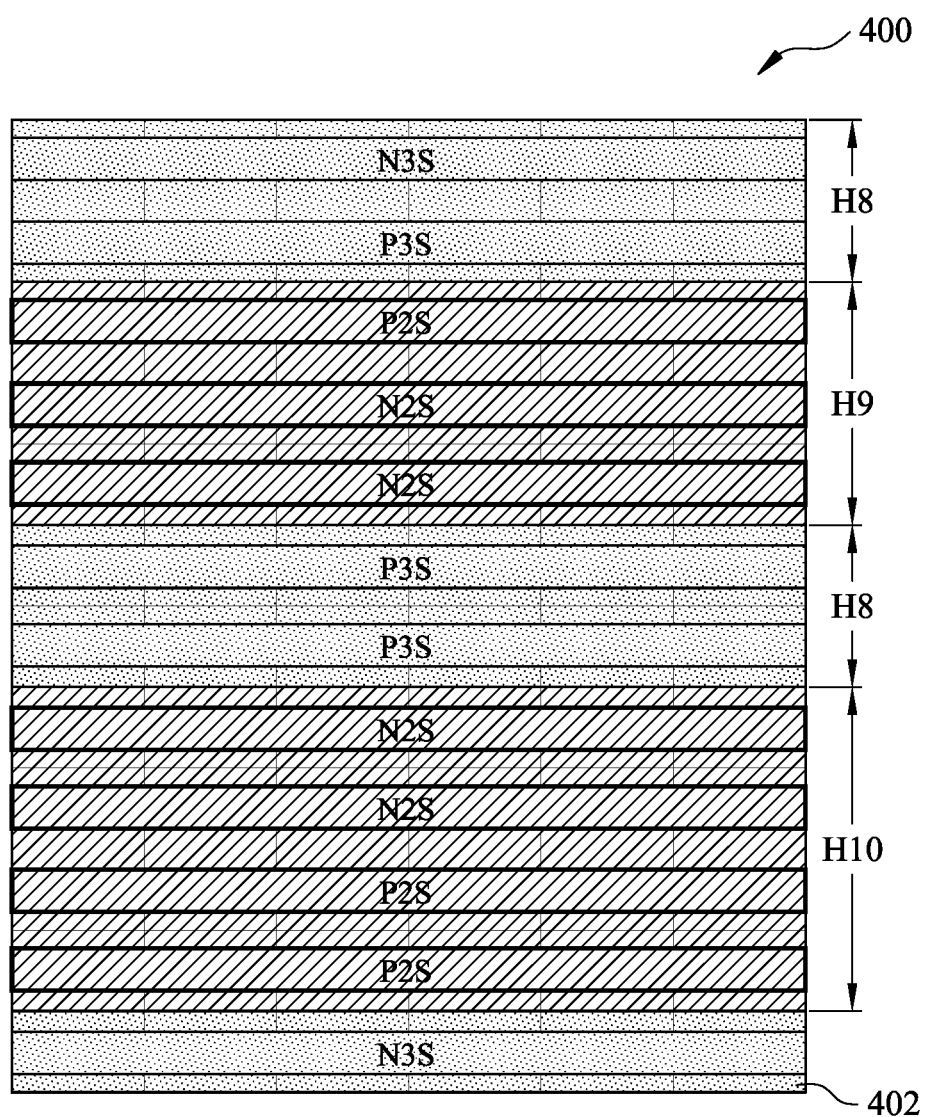
FIG. 16 is a diagram schematically illustrating the device of FIG. 15 with rows having two nanosheets arranged in patterns that have a 1.5× cell height H9 and a 2× cell height H10 and rows having three nanosheets arranged in a pattern that has a 1× cell height H8, in accordance with some embodiments.

FIG. 16 is a diagram schematically illustrating the device 400 with rows having two nanosheets arranged in patterns that have a 1.5× cell height H9 and a 2× cell height H10 and rows having three nanosheets arranged in a pattern that has a 1× cell height H8, in accordance with some embodiments.

In the device 400, one row of PMOS nanosheet structures having two nanosheets and two rows of NMOS nanosheet structures having two nanosheets provide the pattern that has the 1.5× cell height H9, two rows of PMOS nanosheet structures having two nanosheets and two rows of NMOS nanosheet structures having two nanosheets provide the pattern that has the 2× cell height H10, one row of PMOS nanosheet structures having three nanosheets and one row of NMOS nanosheet structures having three nanosheets provide one of the patterns that has the 1× cell height H8, and two PMOS nanosheet structures having three nanosheets provide the other one of the patterns that has the 1× cell height H8.

Thus, the rows having two nanosheets arranged in patterns having a 1.5× cell height H9 and a 2× cell height H10 are each greater than the 1× cell height H, and the rows having three nanosheets are arranged in a pattern having a 1× cell height H8 that is equal to the 1× cell height H. Also, the row plan of the device 400 does not include point touches, such that only one immersion mask is needed to manufacture the patterns, which reduces costs. Also, in some embodiments, in this row plan, the last row 402, which is a row of NMOS nanosheet structures having three nanosheets, can be manufactured with only one immersion mask.

In some embodiments, the device 400 is repeated in the vertical direction in the layout and manufacturing of an integrated circuit. The device 400 is repeated in the vertical direction, such that the last row 402, which is a row of NMOS nanosheet structures having three nanosheets, is adjacent the first two rows of three nanosheet structures situated adjacent each other that have a 1× cell height H8. This results in three rows of the three nanosheet structures, including the first H8 rows and row 402, situated adjacent each other and having a 1.5× cell height, like the 1.5× cell height H9. This pattern repeats itself in the vertical direction until the device 400 is no longer repeated in the vertical direction.

Figure 17:
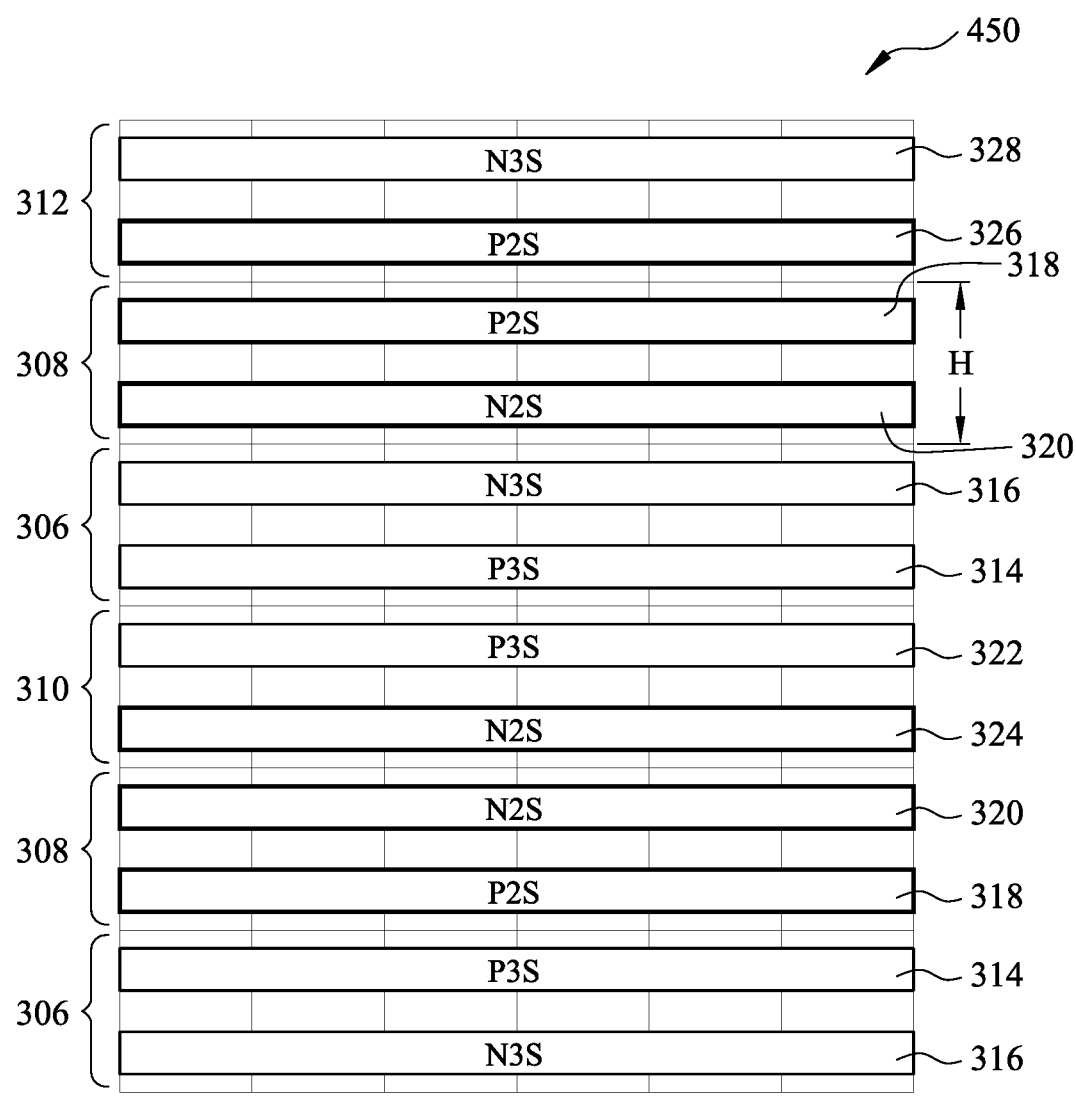
FIG. 17 is a diagram schematically illustrating a device that has a row plan with the ratio of one nanosheet cell structure to another nanosheet cell structure for four nanosheet cell structures of 2:2:1:1, in accordance with some embodiments.

FIG. 17 is a diagram schematically illustrating the device 450 that has a row plan with the ratio of one nanosheet cell structure to another nanosheet cell structure for the four nanosheet cell structures 306, 308, 310, and 312 of 2:2:1:1, respectively, in accordance with some embodiments. The device 450 includes 2 nanosheet cell structures 306, 2 nanosheet cell structures 308, 1 nanosheet cell structure 310, and 1 nanosheet cell structure 312. Each of the nanosheet cell structures 306, 308, 310, and 312 has a 1× cell height H. In other embodiments, the device 450 can have a row plan with a different ratio of one nanosheet cell structure to another nanosheet cell structure for the four nanosheet cell structures 306, 308, 310, and 312.

In this example, the processing system 100 is configured to provide systems and methods, including APR systems and methods, that lay out and manufacture devices, such as the device 450, with patterns of rows having one number of nanosheets, such as two nanosheets or three nanosheets, arranged to have a height that is greater than or equal to the 1× cell height H and without point touches. Thus, only one immersion mask is needed to manufacture these patterns, which reduces costs. In some embodiments, the resolution of the mask is about the same as the 1× cell height H.

Figure 18:
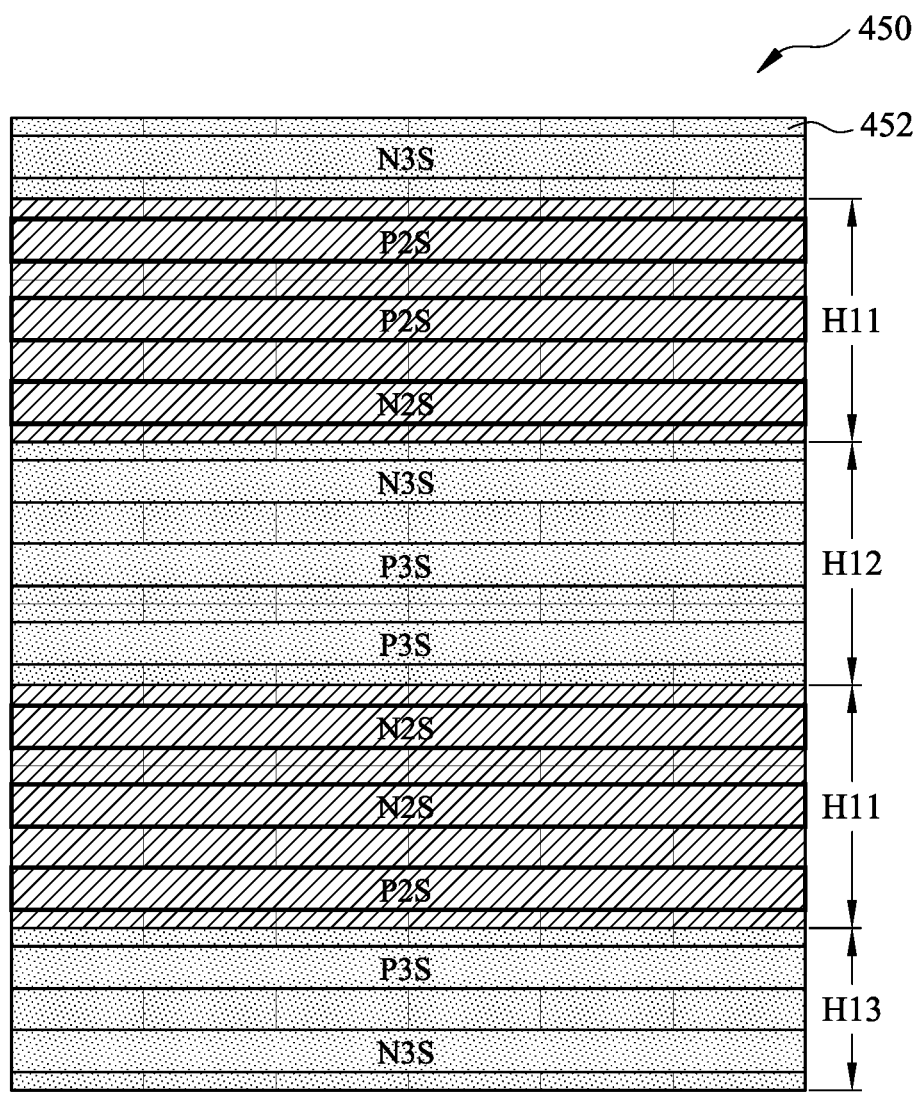
FIG. 18 is a diagram schematically illustrating the device of FIG. 17 with rows having two nanosheets arranged in patterns that have a 1.5× cell height H11 and rows having three nanosheets arranged in patterns that have a 1.5× cell height H12 and a 1× cell height H13, in accordance with some embodiments.

FIG. 18 is a diagram schematically illustrating the device 450 with rows having two nanosheets arranged in patterns that have a 1.5× cell height H11 and rows having three nanosheets arranged in patterns that have a 1.5× cell height H12 and a 1× cell height H13, in accordance with some embodiments.

In the device 450, two rows of PMOS nanosheet structures having two nanosheets and one row of NMOS nanosheet structures having two nanosheets provide a pattern that has the 1.5× cell height H11, one row of PMOS nanosheet structures having two nanosheets and two rows of NMOS nanosheet structures having two nanosheets provide another pattern that has the 1.5× cell height H11, two rows of PMOS nanosheet structures having three nanosheets and one row of NMOS nanosheet structures having three nanosheets provide the pattern that has the 1.5× cell height H12, and one row of PMOS nanosheet structures having three nanosheets and one row of NMOS nanosheet structures having three nanosheets provide the pattern that has the 1× cell height H13.

Thus, the rows having two nanosheets arranged in patterns having a 1.5× cell height H11 are each greater than the 1× cell height H, and the rows having three nanosheets are arranged in one pattern having a 1.5× cell height H12 that is greater than the 1× cell height H and one pattern having a 1× cell height H13 that is equal to the 1× cell height H. Also, the row plan of the device 450 does not include point touches, such that only one immersion mask is needed to manufacture the patterns, which reduces costs. Also, in some embodiments, in this row plan, the first row 452, which is a row of NMOS nanosheet structures having three nanosheets, can be manufactured with only one immersion mask.

In some embodiments, the device 450 is repeated in the vertical direction in the layout and manufacturing of an integrated circuit. The device 450 is repeated in the vertical direction, such that the rows having three nanosheets arranged in the pattern having a 1× cell height H13 are adjacent the first row 452, which is a row of NMOS nanosheet structures having three nanosheets. This results in the three rows of the three nanosheet structures, including the H13 rows and row 452, situated adjacent each other and having a 1.5× cell height, like the 1.5× cell height H12. This pattern repeats itself in the vertical direction until the device 450 is no longer repeated in the vertical direction.

Figure 19:
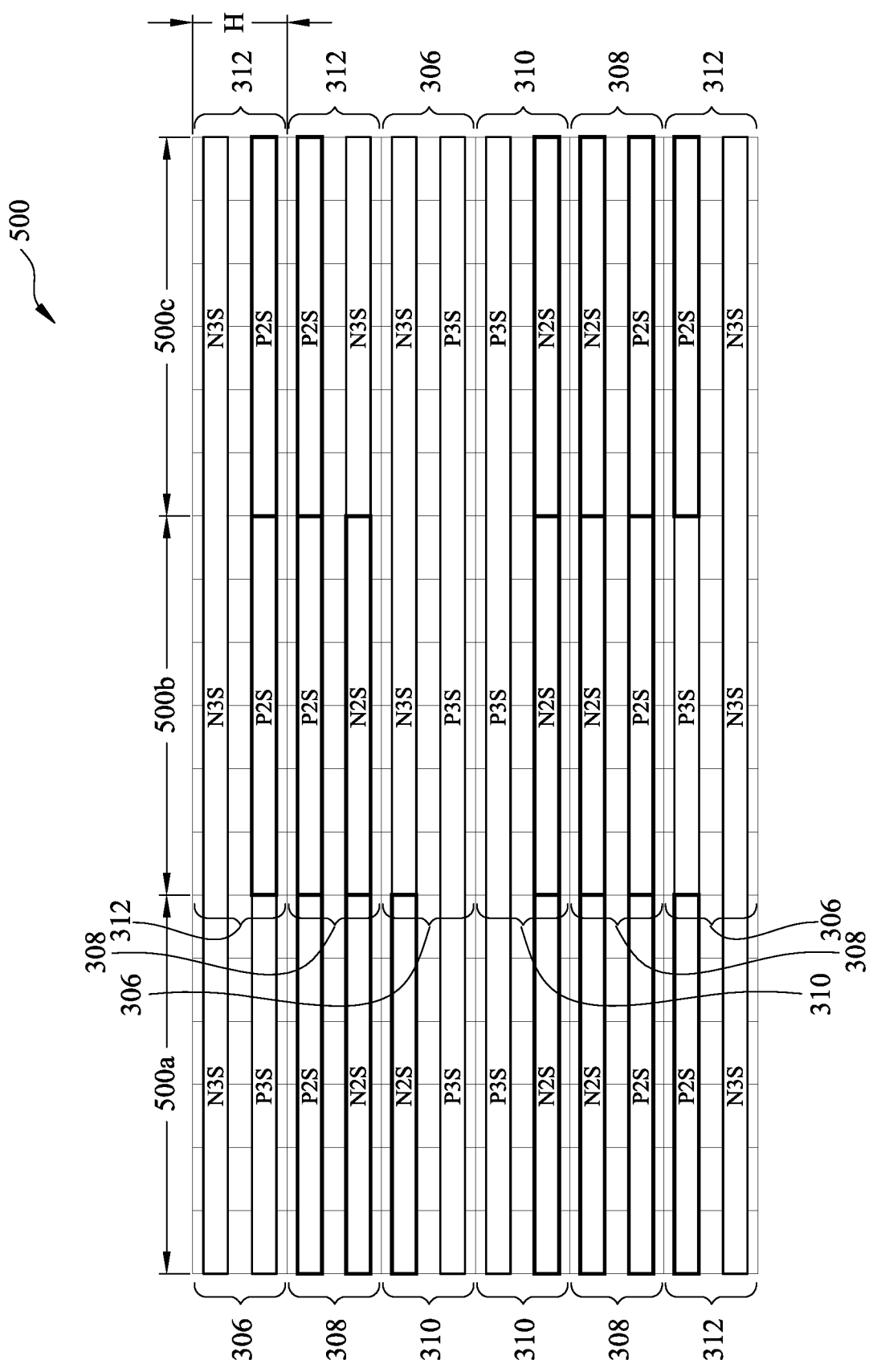
FIG. 19 is a diagram schematically illustrating a device that has three different parts or portions, where each of the parts has a different row plan or pattern, in accordance with some embodiments.

FIG. 19 is a diagram schematically illustrating a device 500 that has three parts 500a, 500b, and 500c, where each of the parts 500a, 500b, and 500c has a different row plan or pattern, in accordance with some embodiments.

The device part 500a has a row plan with a ratio of one nanosheet cell structure to another nanosheet cell structure for the four nanosheet cell structures 306, 308, 310, and 312 of 1:2:2:1, respectively. The device part 500a includes 1 nanosheet cell structure 306, 2 nanosheet cell structures 308, 2 nanosheet cell structures 310, and 1 nanosheet cell structure 312. Each of the nanosheet cell structures 306, 308, 310, and 312 has a 1× cell height H. In other embodiments, the device part 500a can have a row plan with a different ratio of one nanosheet cell structure to another nanosheet cell structure for the four nanosheet cell structures 306, 308, 310, and 312.

The device part 500b has a row plan with a ratio of one nanosheet cell structure to another nanosheet cell structure for the four nanosheet cell structures 306, 308, 310, and 312 of 2:2:1:1, respectively. The device part 500b includes 2 nanosheet cell structures 306, 2 nanosheet cell structures 308, 1 nanosheet cell structure 310, and 1 nanosheet cell structure 312. Each of the nanosheet cell structures 306, 308, 310, and 312 has a 1× cell height H. In other embodiments, the device part 500b can have a row plan with a different ratio of one nanosheet cell structure to another nanosheet cell structure for the four nanosheet cell structures 306, 308, 310, and 312.

The device part 500c has a row plan with a ratio of one nanosheet cell structure to another nanosheet cell structure for the four nanosheet cell structures 306, 308, 310, and 312 of 1:1:1:3, respectively. The device part 500c includes 1 nanosheet cell structure 306, 1 nanosheet cell structure 308, 1 nanosheet cell structure 310, and 3 nanosheet cell structures 312. Each of the nanosheet cell structures 306, 308, 310, and 312 has a 1× cell height H. In other embodiments, the device part 500c can have a row plan with a different ratio of one nanosheet cell structure to another nanosheet cell structure for the four nanosheet cell structures 306, 308, 310, and 312.

In this example, the processing system 100 is configured to provide systems and methods, including APR systems and methods, that lay out and manufacture devices, such as the device 500, with patterns of rows having one number of nanosheets, such as two nanosheets or three nanosheets, arranged to have a height that is greater than or equal to the 1× cell height H and without point touches. Thus, only one immersion mask is needed to manufacture these patterns, which reduces costs. In some embodiments, the resolution of the mask is about the same as the 1× cell height H.

Figure 20:
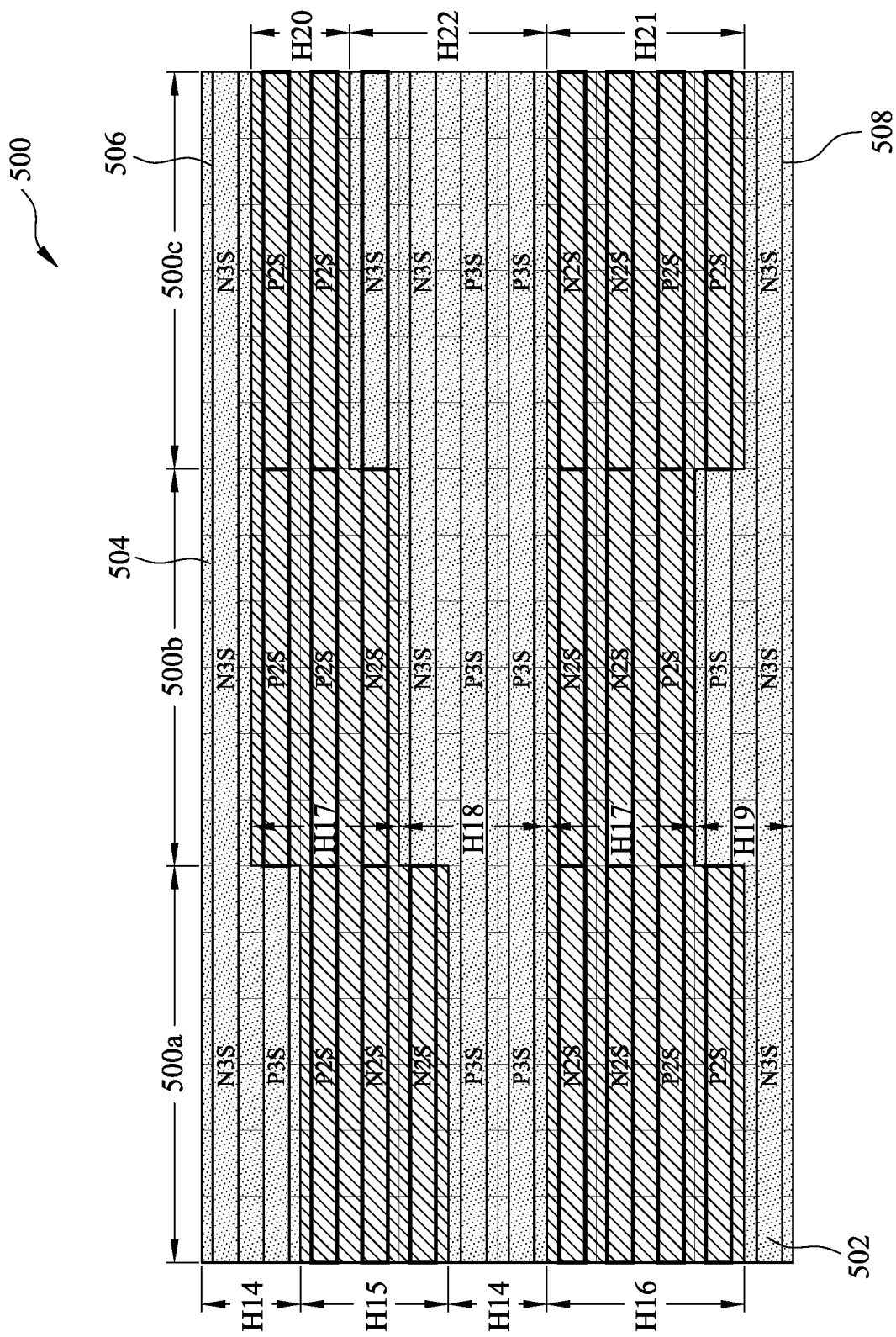
FIG. 20 is a diagram schematically illustrating the device of FIG. 19 that has three parts, where each of the parts has rows with two nanosheets and three nanosheets arranged in different patterns, in accordance with some embodiments.

FIG. 20 is a diagram schematically illustrating the device 500 that has three parts 500a, 500b, and 500c, where each of the parts 500a, 500b, and 500c has rows with two nanosheets and three nanosheets arranged in different patterns, in accordance with some embodiments.

The device part 500a includes one row of PMOS nanosheet structures having three nanosheets and one row of NMOS nanosheet structures having three nanosheets that provide a pattern that has a 1× cell height H14, two rows of PMOS nanosheet structures having three nanosheets that provide a pattern that has the 1× cell height H14, one row of PMOS nanosheet structures having two nanosheets and two rows of NMOS nanosheet structures having two nanosheets provide a pattern that has a 1.5× cell height H15, and two rows of PMOS nanosheet structures having two nanosheets and two rows of NMOS nanosheet structures having two nanosheets that provide a pattern that has a 2× cell height H16.

Thus, the rows having two nanosheets are arranged in patterns having a 1.5× cell height H15 and a 2× cell height H16, which are each greater than the 1× cell height H, and the rows having three nanosheets are arranged in a pattern having a 1× cell height H14 that is equal to the 1× cell height H. Also, the row plan of the device part 500a does not include point touches, such that only one immersion mask is needed to manufacture the patterns, which reduces costs. Also, in some embodiments, in this row plan, the last row 502, which is a row of NMOS nanosheet structures having three nanosheets, can be manufactured with only one immersion mask.

The device part 500b includes two rows of PMOS nanosheet structures having two nanosheets and one row of NMOS nanosheet structures having two nanosheets that provide a pattern that has a 1.5× cell height H17, one row of PMOS nanosheet structures having two nanosheets and two rows of NMOS nanosheet structures having two nanosheets that provide a pattern that has the 1.5× cell height H17, two rows of PMOS nanosheet structures having three nanosheets and one row of NMOS nanosheet structures having three nanosheets that provide a pattern that has a 1.5× cell height H18, and one row of PMOS nanosheet structures having three nanosheets and one row of NMOS nanosheet structures having three nanosheets that provide a pattern that has a 1× cell height H19.

Thus, the rows having two nanosheets are arranged in patterns having a 1.5× cell height H17 that is greater than the 1× cell height H, and the rows having three nanosheets are arranged in one pattern having a 1.5× cell height H18 that is greater than the 1× cell height H and one pattern having a 1× cell height H19 that is equal to the 1× cell height H. Also, the row plan of the device part 500b does not include point touches, such that only one immersion mask is needed to manufacture the patterns, which reduces costs. Also, in some embodiments, in this row plan, the first row 504, which is a row of NMOS nanosheet structures having three nanosheets, can be manufactured with only one immersion mask.

The device part 500c includes two rows of PMOS nanosheet structures having two nanosheets that provide a pattern that has a 1× cell height H20, two rows of PMOS nanosheet structures having two nanosheets and two rows of NMOS nanosheet structures having two nanosheets that provide a pattern that has a 2× cell height H21, and two rows of PMOS nanosheet structures having three nanosheets and two rows of NMOS nanosheet structures having three nanosheets that provide a pattern that has a 2× cell height H22.

Thus, the rows having two nanosheets are arranged in patterns having a 1× cell height H20 that is equal to the 1× cell height H and a 2× cell height H21 that is greater than the 1× cell height H, and the rows having three nanosheets are arranged in a pattern having a 2× cell height H22 that is greater than the 1× cell height H. Also, the row plan of the device part 500c does not include point touches, such that only one immersion mask is needed to manufacture the patterns, which reduces costs. Also, in some embodiments, in this row plan, the first row 506 and the last row 508, which are rows of NMOS nanosheet structures having three nanosheets, can be manufactured with only one immersion mask.

In some embodiments, the device 500 is repeated in the vertical direction in the layout and manufacturing of an integrated circuit. The device 500 is repeated in the vertical direction, such that the last row 502, which is a row of NMOS nanosheet structures having three nanosheets, is adjacent the first two rows of three nanosheet structures situated adjacent each other that have a 1× cell height H14. This results in the three rows of three nanosheet structures, including the first H14 rows and row 502, situated adjacent each other and having a 1.5× cell height. Also, the two rows having three nanosheets arranged in the pattern having a 1× cell height H19 are adjacent the first row 504, which is a row of NMOS nanosheet structures having three nanosheets. This results in the three rows of three nanosheet structures, including the H19 rows and row 504, situated adjacent each other and having a 1.5× cell height. In addition, the last row 508, which is a row of NMOS nanosheet structures having three nanosheets, is adjacent the first row 506, which is a row of NMOS nanosheet structures having three nanosheets. This results in the two rows of three nanosheet structures, including the last row 508 and the first row 506, situated adjacent each other and having a 1× cell height. This pattern repeats itself in the vertical direction until the device 500 is no longer repeated in the vertical direction.

The device 500 includes the device parts 500a, 550b, and 500c situated adjacent each other and without point touches, such that only one immersion mask is needed to manufacture the patterns, which reduces costs.

Figure 21:
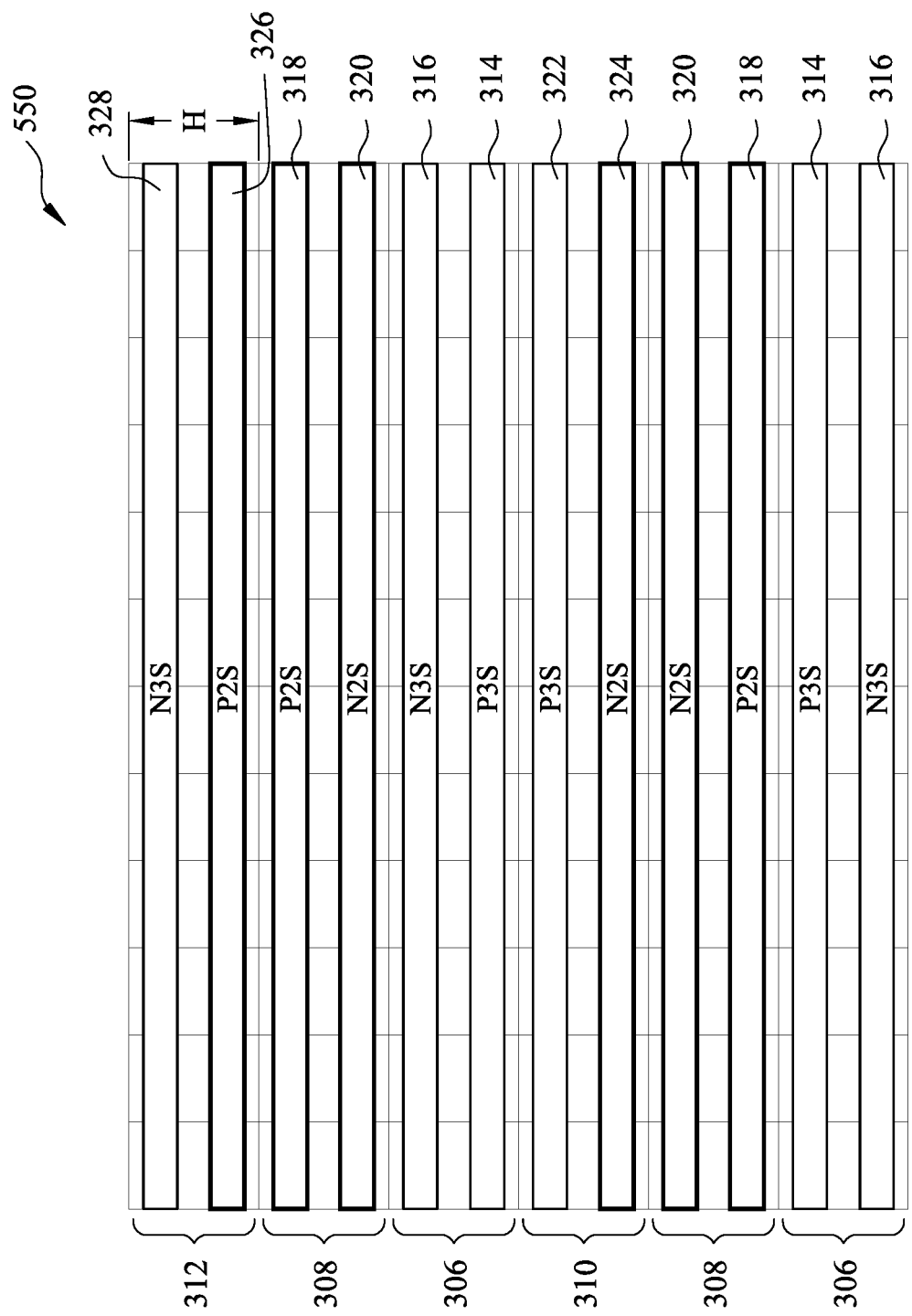
FIG. 21 is a diagram schematically illustrating a row plan for a device, prior to inserting another device into the row plan of the device, in accordance with some embodiments.
Figure 22:
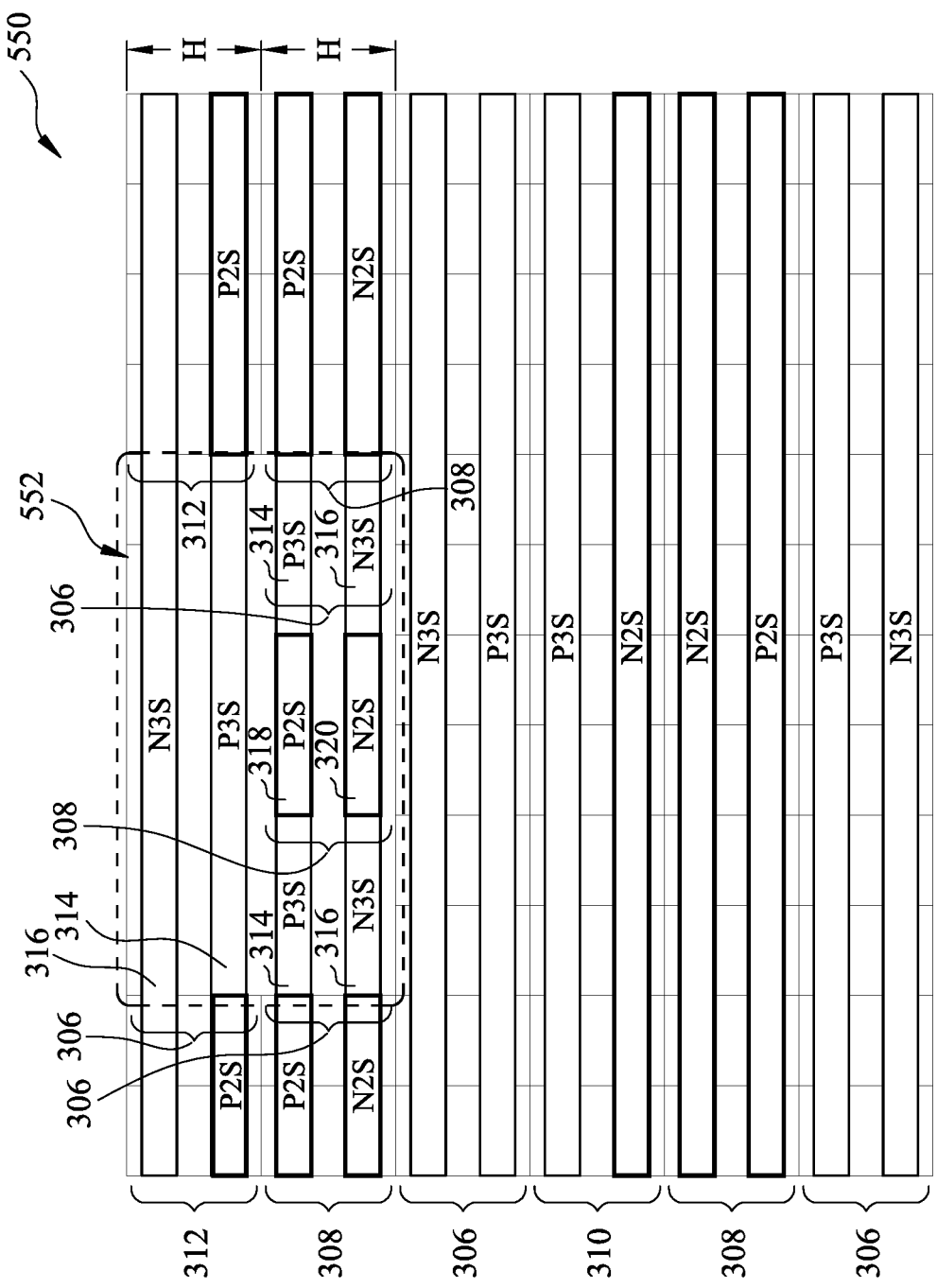
FIG. 22 is a diagram schematically illustrating the device of FIG. 21 with the other device inserted into the row plan of the device of FIG. 21, in accordance with some embodiments.
Figure 23:
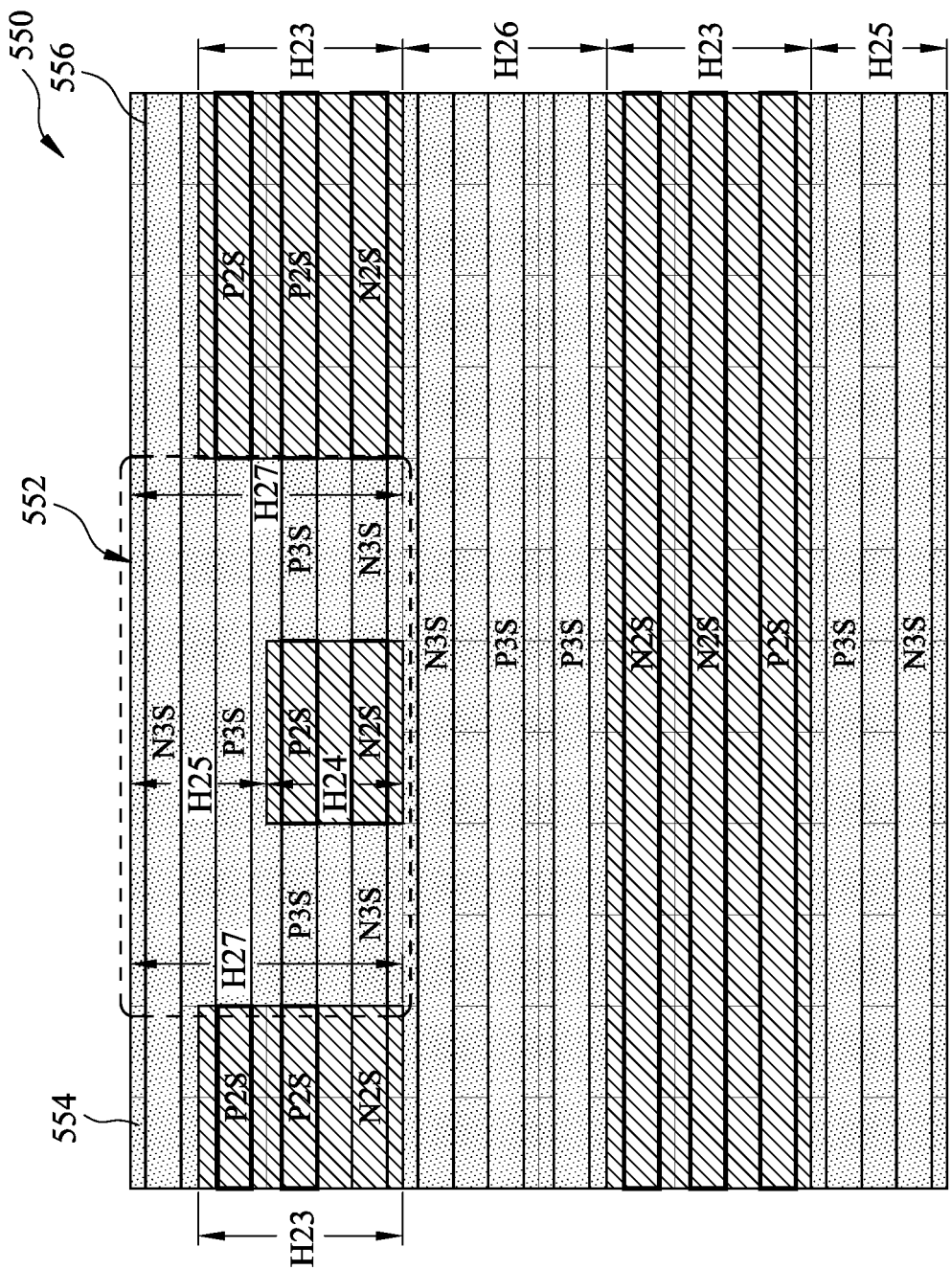
FIG. 23 is a diagram schematically illustrating the device of FIG. 22 with rows of two nanosheets and rows of three nanosheets arranged in different patterns, in accordance with some embodiments.

FIGS. 21-23 are diagrams schematically illustrating a device 550 that includes another device 552 inserted into the row plan of the device 550, in accordance with some embodiments. Each of the devices 550 and 552 includes a row plan that obeys the criteria that rows with two nanosheets are arranged in patterns that have a height that is greater than or equal to the 1× cell height H and that rows of three nanosheets are arranged in patterns that have a height that is greater than or equal to the 1× cell height H. Inserting a device, such as the device 552, that obeys these criteria into a device, such as the device 550, that obeys these criteria increases the freedom of design of devices that can be manufactured with only one immersion mask for patterns in the devices, which reduces costs.

FIG. 21 is a diagram schematically illustrating an initial row plan for the device 550, prior to inserting the other device 552 into the row plan of the device 550, in accordance with some embodiments. The device 550 has an initial row plan with the ratio of one nanosheet cell structure to another nanosheet cell structure for the four nanosheet cell structures 306, 308, 310, and 312 of 2:2:1:1, respectively. The initial row plan of the device 550 includes 2 nanosheet cell structures 306, 2 nanosheet cell structures 308, 1 nanosheet cell structure 310, and 1 nanosheet cell structure 312. Each of the nanosheet cell structures 306, 308, 310, and 312 has a 1× cell height H. In other embodiments, the device 550 can have an initial row plan with a different ratio of one nanosheet cell structure to another nanosheet cell structure for the four nanosheet cell structures 306, 308, 310, and 312.

FIG. 22 is a diagram schematically illustrating the device 552 inserted into the row plan of the device 550, in accordance with some embodiments. The device 552 has a row plan that includes 3 nanosheet cell structures 306 and 1 nanosheet cell structure 308. Each of the nanosheet cell structures 306 and 308 of the device 552 has a 1× cell height H. In other embodiments, the device 552 can have a row plan that has a different ratio of one nanosheet cell structure to another nanosheet cell structure including one or more of the four nanosheet cell structures 306, 308, 310, and 312.

In this example, the processing system 100 is configured to provide systems and methods, including APR systems and methods, that lay out and manufacture devices, such as the device 550 including the device 552, with patterns of rows having one number of nanosheets, such as two nanosheets or three nanosheets, arranged to have a height that is greater than or equal to the 1× cell height H and without point touches. Thus, only one immersion mask is needed to manufacture these patterns, which reduces costs. In some embodiments, the resolution of the mask is about the same as the 1× cell height H.

FIG. 23 is a diagram schematically illustrating the device 550 including the device 552, in accordance with some embodiments. The device 550 includes rows or portions of rows having two nanosheets arranged in patterns that have a 1.5× cell height H23 and a 1× cell height H24 and with rows or portions of rows having three nanosheets arranged in patterns that have a 1× cell height H25, a 1.5× cell height H26, and a 2× cell height H27.

In the device 550, two partial rows of PMOS nanosheet structures having two nanosheets and one partial row of NMOS nanosheet structures having two nanosheets provide patterns on each side of the device 552 and toward the top of the device 550 that have the 1.5× cell height H23, two rows of NMOS nanosheet structures having two nanosheets and one row of PMOS nanosheet structures having two nanosheets provide a pattern toward the bottom of device 550 that has the 1.5× cell height H23, and one partial row of PMOS nanosheet structures having two nanosheets and one partial row of NMOS nanosheet structures having two nanosheets provide a pattern that has the 1× cell height H24 in device 552. Also, one partial row of PMOS nanosheet structures having three nanosheets and one partial row of NMOS nanosheet structures having three nanosheets provide a pattern that has the 1× cell height H25 in device 552, one full row of PMOS nanosheet structures having three nanosheets and one full row of NMOS nanosheet structures having three nanosheets provide a pattern that has the 1× cell height H25 at the bottom of device 550, two rows of PMOS nanosheet structures having three nanosheets and one row of NMOS nanosheet structures having three nanosheets provide the pattern that has the 1.5× cell height H26, and two partial rows of PMOS nanosheet structures having three nanosheets and two partial rows of NMOS nanosheet structures having three nanosheets provide the patterns that have the 2× cell height H27 in device 552.

Thus, the patterns of rows having two nanosheets arranged in patterns having a 1.5× cell height H23 and a 1× cell height H24 are greater than or equal to the 1× cell height H, and the patterns of rows having three nanosheets arranged in patterns having a 1× cell height H25, a 1.5× cell height H26, and a 2× cell height H27 are greater than or equal to the cell height H. Also, the row plan of the device 550, including the device 552, does not include point touches, such that only one immersion mask is needed to manufacture these patterns, which reduces costs. Also, in some embodiments, in this row plan, a portion of the first row at the left 554 and at the right 556, which is a row of NMOS nanosheet structures having three nanosheets, can be manufactured with only one immersion mask.

In some embodiments, the device 550 is repeated in the vertical direction in the layout and manufacturing of an integrated circuit. The device 550 is repeated in the vertical direction, such that the rows having three nanosheets arranged in the pattern having a 1× cell height H25 are adjacent the first row at the left 554, the device 552, and the first row at the right 556, which are rows having three nanosheets. This pattern repeats itself in the vertical direction until the device 550 is no longer repeated in the vertical direction.

Figure 24:
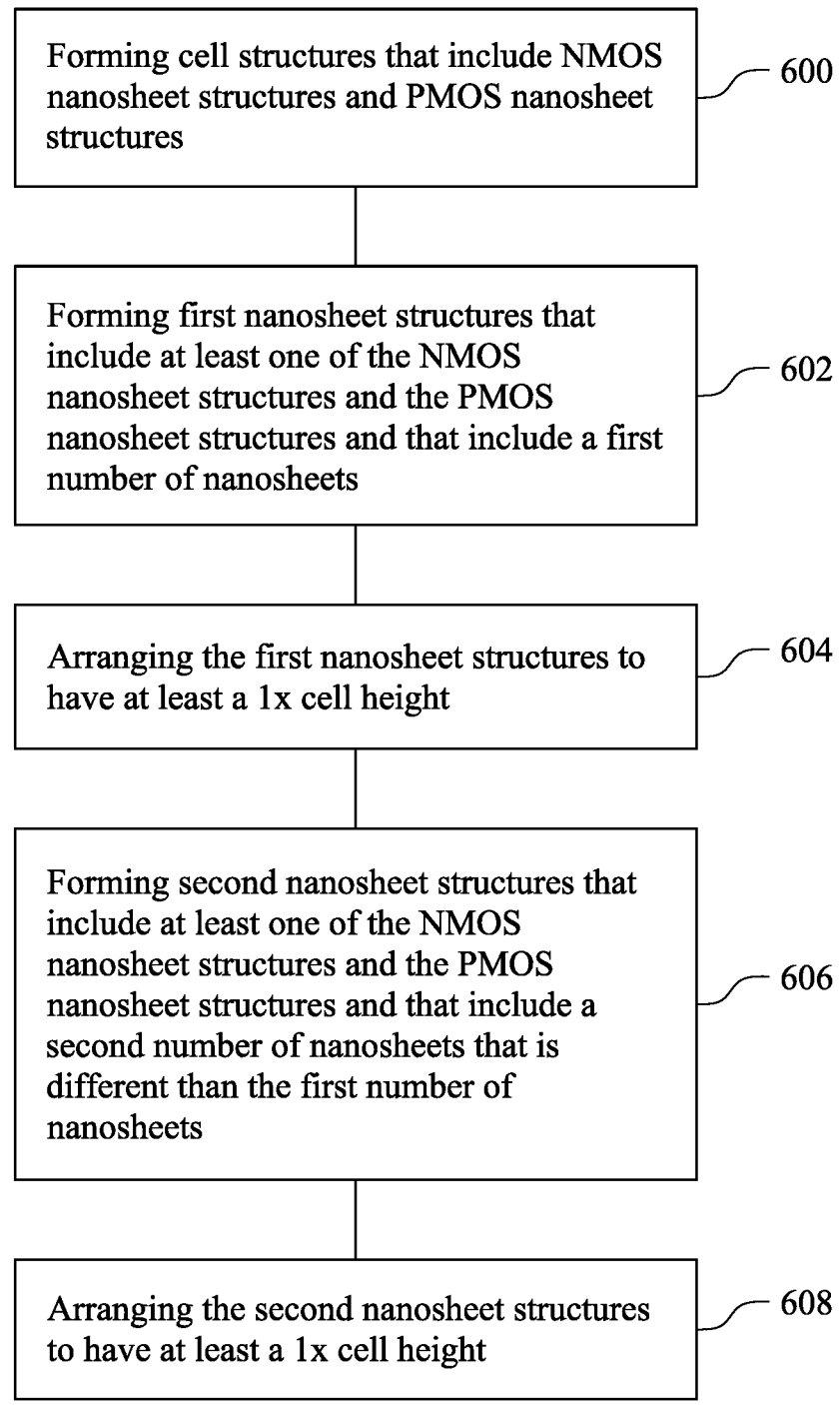
FIG. 24 is a diagram schematically illustrating a method of manufacturing an integrated circuit that includes rows of nanosheet structures having the same number of nanosheets and situated in a pattern that has a height that is greater than or equal to a 1× cell height H, in accordance with some embodiments.

FIG. 24 is a diagram schematically illustrating a method of manufacturing an integrated circuit that includes rows of nanosheet structures having the same number of nanosheets and situated in a pattern that has a height that is greater than or equal to a 1× cell height H, in accordance with some embodiments. At 600, the method includes forming cell structures that include NMOS nanosheet structures and PMOS nanosheet structures.

At 602, the method includes forming first nanosheet structures that include at least one of the NMOS nanosheet structures and the PMOS nanosheet structures and that include a first number of nanosheets. In some embodiments, forming the first nanosheet structures includes forming the first nanosheet structures to have one of two nanosheets and three nanosheets.

At 604, the method includes arranging the first nanosheet structures to have at least a 1× cell height. In some embodiments, arranging the first nanosheet structures to have at least a 1× cell height includes arranging at least one NMOS nanosheet structure adjacent at least one PMOS nanosheet structure.

At 606, the method includes forming second nanosheet structures that include at least one of the NMOS nanosheet structures and the PMOS nanosheet structures and that include a second number of nanosheets. In some embodiments, forming the second nanosheet structures includes forming the second nanosheet structures to have one of two nanosheets and three nanosheets. In some embodiments, the first number of nanosheet structures is the same as the second number of nanosheet structures and, in some embodiments, the first number of nanosheet structures is different than the second number of nanosheet structures.

At 608, the method includes arranging the second nanosheet structures to have at least a 1× cell height. In some embodiments, arranging the second nanosheet structures to have at least a 1× cell height includes arranging at least one NMOS nanosheet structure adjacent at least one PMOS nanosheet structure.

In some embodiments, forming the cell structures includes forming first cell structures that include at least one of the first NMOS nanosheet structures that include the first number of nanosheets and at least one of the first PMOS nanosheet structures that include the second number of nanosheets, where the first number of nanosheet structures is the same as the second number of nanosheet structures. In some embodiments, forming the cell structures includes forming first cell structures that include at least one of the first NMOS nanosheet structures that include the first number of nanosheets and at least one of the first PMOS nanosheet structures that include the second number of nanosheets, where the first number of nanosheet structures is different than the second number of nanosheet structures.

In some embodiments, forming the cell structures includes forming first cell structures that include at least one of the first PMOS nanosheet structures that include the first number of nanosheets and at least one of the first NMOS nanosheet structures that include the second number of nanosheets. In some embodiments, forming the cell structures includes forming first cell structures that include at least one of the first NMOS nanosheet structures that include the first number of nanosheets and at least one of the first PMOS nanosheet structures that include the second number of nanosheets.

Thus, disclosed embodiments provide systems and methods configured to provide devices having patterns of rows of nanosheet structures with the same number of nanosheets, which are greater than or equal to a 1× cell height and without point touches. Disclosed embodiments include devices and methods of manufacturing devices that include first nanosheet structures including a first number of nanosheets and second nanosheet structures including a second number of nanosheets that is different than the first number of nanosheets, where each of the first nanosheet structures and the second nanosheet structures are arranged in the device to have at least a 1× cell height.

Disclosed embodiments further include standard cells that have a 1× cell height H that is equal to the height of two rows of nanosheet structures, such as one row of NMOS nanosheet structures and one row of PMOS nanosheet structures. Also, disclosed embodiments include devices and methods of manufacturing devices that include row plans that include a plurality of cell structures, where each of the cell structures includes NMOS nanosheet structures in a first row and PMOS nanosheet structures in a second row, and where NMOS and PMOS nanosheet structures that have the same number of nanosheets are situated adjacent one another to provide at least a 1× cell height.

In some embodiments, the row plans include first cell structures that include NMOS nanosheet structures that include a first number of nanosheets and PMOS nanosheet structures that include a second number of nanosheets, and second cell structures that include NMOS nanosheet structures that include a third number of nanosheets and PMOS nanosheet structures that include a fourth number of nanosheets, where different row plans include different ratios of the first cell structures to the second cell structures.

In accordance with some embodiments, a device including first nanosheet structures each including a first number of nanosheets, second nanosheet structures each including a second number of nanosheets that is different than the first number of nanosheets, and a plurality of rows including first rows and second rows. Where, each of the first nanosheet structures is in a respective one of the first rows, each of the second nanosheet structures is in a respective one of the second rows, at least two of the first rows are adjacent one another, and at least two of the second rows are adjacent one another.

In accordance with further embodiments, a device including a first row plan that includes a plurality of cell structures, where each of the plurality of cell structures includes NMOS nanosheet structures in a first row and PMOS nanosheet structures in a second row. The device further including a first group of nanosheet structures including at least two rows, where the at least two rows include: the NMOS nanosheet structures having a first number of nanosheets; or the PMOS nanosheet structures having the first number of nanosheets; or the NMOS nanosheet structures having the first number of nanosheets and the PMOS nanosheet structures having the first number of nanosheets.

In accordance with still further disclosed aspects, a method of manufacturing an integrated circuit includes: forming first nanosheet structures that include NMOS nanosheet structures with a first number of nanosheets or PMOS nanosheet structures with the first number of nanosheets or the NMOS nanosheet structures with the first number of nanosheets and the PMOS nanosheet structures with the first number of nanosheets; forming the first nanosheet structures into a first group of at least two rows of the first nanosheet structures; forming second nanosheet structures that include NMOS nanosheet structures with a second number of nanosheets that is different than the first number of nanosheets or PMOS nanosheet structures with the second number of nanosheets that is different than the first number of nanosheets or the NMOS nanosheet structures with the second number of nanosheets that is different than the first number of nanosheets and the PMOS nanosheet structures with the second number of nanosheets that is different than the first number of nanosheets; and forming the second nanosheet structures into a second group of at least two rows of the second nanosheet structures.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:
    a first cell structure that includes:
        first rows that each include first nanosheet structures that each include a first number of nanosheets; and
        second rows that are adjacent the first rows and that each include second nanosheet structures that each include a second number of nanosheets, where the second number is different than the first number; and
    a plurality of rows including the first rows and the second rows,
    wherein each of the first nanosheet structures is in a respective one of the first rows and each of the second nanosheet structures is in a respective one of the second rows, and
    wherein at least two of the first rows are adjacent one another and at least two of the second rows are adjacent one another.

2. The device of claim 1, wherein the first nanosheet structures include at least one selected from the group of NMOS nanosheet structures and PMOS nanosheet structures.

3. The device of claim 1, wherein the second nanosheet structures include at least one selected from the group of NMOS nanosheet structures and PMOS nanosheet structures.

4. The device of claim 1, wherein the first nanosheet structures are one of NMOS nanosheet structures and PMOS nanosheet structures and the second nanosheet structures are the other one of the NMOS nanosheet structures and the PMOS nanosheet structures.

5. The device of claim 1, comprising a second cell structure that includes:
    third rows that each include third nanosheet structures that each include a third number of nanosheets, and
    fourth rows that are adjacent the third rows and that each include fourth nanosheet structures that each include a fourth number of nanosheets, where the fourth number is the same as the third member.

6. The device of claim 1, wherein the first cell structure is a hybrid cell structure and comprising a row plan that includes only hybrid cell structures.

7. The device of claim 1, comprising a plurality of cell structures that each include a first row of NMOS nanosheet structures and a second row of PMOS nanosheet structures.

8. The device of claim 1, comprising a plurality of hybrid cell structures that each include the first nanosheet structures arranged in a first row and the second nanosheet structures arranged in a second row, where the first nanosheet structures are one of NMOS nanosheet structures and PMOS nanosheet structures and the second nanosheet structures are the other one of the NMOS nanosheet structures and the PMOS nanosheet structures.

9. The device of claim 1, comprising a plurality of row plans that each include the first cell structure, where row plans of the plurality of row plans are situated adjacent one another.

10. The device of claim 1, comprising a first pattern of nanosheet structures including a first group of the first nanosheet structures and a second group of the second nanosheet structures and a second pattern of nanosheet structures including a third group of third nanosheet structures inserted into the first pattern of nanosheet structures.

11. A device, comprising:
    a first row plan that includes a plurality of cell structures, where each of the plurality of cell structures has a 1× cell height and includes first nanosheet structures in a first row and second nanosheet structures in a second row that is adjacent the first row, the first row plan includes:
        a first group of nanosheet structures that has a 1.5× cell height and includes three rows of the first nanosheet structures and the second nanosheets structures that each have three nanosheets; and
        a second group of nanosheet structures that has a 2× cell height and includes four rows of the first nanosheet structures and the second nanosheets structures that each have two nanosheets,
    wherein three rows of the first group of nanosheet structures is adjacent the four rows of the second group of nanosheet structures, such that one of the nanosheet structures having three nanosheets is adjacent one of the nanosheet structures having two nanosheets.

12. The device of claim 11, wherein the first row plan includes first cell structures that include NMOS nanosheet structures that include a first number of nanosheets and PMOS nanosheet structures that include a second number of nanosheets and second cell structures that include NMOS nanosheet structures that include a third number of nanosheets and PMOS nanosheet structures that include a fourth number of nanosheets, wherein:

the third number of nanosheets is different than the first number of nanosheets and the fourth number of nanosheets is different than the second number of nanosheets.

13. The device of claim 12, wherein the first number of nanosheets is different than the second number of nanosheets.

14. The device of claim 12, comprising a second row plan that includes the first cell structures and the second cell structures.

15. The device of claim 12, wherein the first row plan includes a first ratio of the first cell structures to the second cell structures and a second row plan includes a second ratio of the first cell structures to the second cell structures.

16. A method of manufacturing an integrated circuit comprising:

forming first cell structures that include first nanosheet structures that include:
NMOS nanosheet structures with a first number of nanosheets; and
PMOS nanosheet structures with the first number of nanosheets;

forming second cell structures that include second nanosheet structures that include:
NMOS nanosheet structures with a second number of nanosheets; and
PMOS nanosheet structures with a third number of nanosheets, where the second number is different than the third number and the NMOS nanosheet structures with the second number of nanosheets are situated adjacent the PMOS nanosheet structures with the third number of nanosheets.

17. The method of claim 16, comprising:

forming cell structures that include a first row of the NMOS nanosheet structures with the first number of nanosheets situated adjacent a second row of the PMOS nanosheet structures with the first number of nanosheets.

18. The method of claim 16, comprising:

forming cell structures that include a first row of the NMOS nanosheet structures with the first number of nanosheets and a second row of the PMOS nanosheet structures with the second number of nanosheets, where the second number is different than the first number.

19. The method of claim 16, wherein the first number of nanosheets is two nanosheets or three nanosheets.

20. The method of claim 16, comprising forming the first nanosheet structures and the second nanosheet structures into a group of at least three rows of nanosheet structures that have the same number of nanosheets.

* * * * *